(12) United States Patent
Kuroda

(10) Patent No.: US 8,964,152 B2
(45) Date of Patent: Feb. 24, 2015

(54) ACTIVE MATRIX SUBSTRATE, DISPLAY PANEL, DISPLAY DEVICE, AND TELEVISION RECEPTION DEVICE

(75) Inventor: Tatsuro Kuroda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 11 days.

(21) Appl. No.: 13/983,519

(22) PCT Filed: Feb. 9, 2012

(86) PCT No.: PCT/JP2012/052955
§ 371 (c)(1),
(2), (4) Date: Aug. 2, 2013

(87) PCT Pub. No.: WO2012/111522
PCT Pub. Date: Aug. 23, 2012

(65) Prior Publication Data
US 2013/0314617 A1 Nov. 28, 2013

(30) Foreign Application Priority Data
Feb. 16, 2011 (JP) .................................. 2011-031224

(51) Int. Cl.
*G02F 1/136* (2006.01)
*G02F 1/1362* (2006.01)

(52) U.S. Cl.
CPC .... *G02F 1/136286* (2013.01); *G02F 1/136213* (2013.01); *G02F 1/136227* (2013.01); *G02F 2201/40* (2013.01); *G02F 2001/136236* (2013.01)

USPC .................................. 349/138; 349/38; 349/39

(58) Field of Classification Search
USPC .............................. 349/38–39, 138
See application file for complete search history.

(56) References Cited

U.S. PATENT DOCUMENTS 6,232,620 B1 5/2001 Katoh

FOREIGN PATENT DOCUMENTS

JP H11-142879 A 5/1999

OTHER PUBLICATIONS

U.S. Appl. No. 13/983,516, filed Aug. 2, 2013.

*Primary Examiner* — Phu Vu
(74) *Attorney, Agent, or Firm* — Chen Yoshimura LLP

(57) ABSTRACT

The array substrate 20 of the present invention includes pixel electrodes 25 formed in an area demarcated by a plurality of gate wiring lines 26 and source wiring lines 27 that intersect each other, and capacitance wiring lines 126 that are arranged in parallel with the gate wiring lines 26 and that form a capacitance with the pixel electrodes 25. The capacitance wiring lines 126 are arranged overlapping outer edges of the adjacent pixel electrodes 25, and formed on the capacitance wiring line 126 are: a first insulating film that covers the capacitance wiring line 126; a second insulating film 29 that is an insulating film formed on the first insulating film, and that has a protruding band part 129 with a line width narrower than the capacitance wiring line 126 and arranged along the capacitance wiring line 126. The pixel electrodes 25 are above the second insulating film 29 and are formed so the outer edges 125 of the adjacent pixel electrodes 25 and 25 ride up on the protruding band part 129.

7 Claims, 20 Drawing Sheets

ACTIVE MATRIX SUBSTRATE, DISPLAY PANEL, DISPLAY DEVICE, AND TELEVISION RECEPTION DEVICE

TECHNICAL FIELD

The present invention relates to an active matrix substrate, a display panel, a display device, and a television receiver.

BACKGROUND ART

Liquid crystal panels (a type of display panel) used for liquid crystal display devices include a pair of substrates arranged so as to face each other, and a liquid crystal layer or the like the like interposed between these substrates. One of these substrates is an active matrix substrate with a plurality of thin-film transistors and pixel electrodes arranged in a matrix on the surface thereof.

The thin-film transistors and pixel electrodes on the active matrix substrate are assigned so as to correspond to respective pixels of the liquid crystal panel. The thin-film transistor and pixel electrode in each pixel is demarcated by a plurality of gate wiring lines, source wiring lines, and the like arranged on the active matrix substrate so as to intersect each other.

When the active matrix substrate is viewed in a plan view, a portion of the pixel electrode appears to overlap a portion of the gate wiring line (or the capacitance wiring line) via an insulating film (an interlayer insulating film) or the like. By arranging a portion of the pixel electrode as such, a capacitance is formed between the pixel electrode and the gate wiring line (see Patent Document 1, for example). It is preferable for the pixel electrode to overlap the gate wiring line as much as possible from the viewpoint of securing the capacitance of each pixel.

RELATED ART DOCUMENT

Patent Document

Patent Document 1: Japanese Patent Application Laid-Open Publication No. H11-142879

Problems to be Solved by the Invention

However, if the outer edges of each pixel electrode on the active matrix substrate are made to overlap the gate wiring line as much as possible, then the pixel electrodes, which are adjacent to each other across the gate wiring line, become too close to each other, and there is the risk of so-called leakage occurring due to the pixel electrodes electrically connecting to each other. If a leakage occurs, those pixels will suffer from two consecutive display anomalies (bright spots, for example).

SUMMARY OF THE INVENTION

The present invention aims at providing: an active matrix substrate where it is possible to set a narrow distance between pixel electrodes adjacent to each other across a capacitance wiring line; a display panel provided with the substrate; a display device provided with the display panel, and a television receiver provided with the display device.

Means for Solving the Problems

An active matrix substrate according to the present invention includes: pixel electrodes formed in respective areas demarcated by a plurality of gate wiring lines and source wiring lines that intersect each other; and capacitance wiring lines that are arranged in parallel with the gate wiring lines, the capacitance wiring lines respectively forming capacitances with the pixel electrodes, wherein the capacitance wiring lines are arranged overlapping outer edges of the pixel electrodes adjacent to each other, wherein each of the capacitance wiring lines has formed thereon: a first insulating film that covers the capacitance wiring line; and a second insulating film formed on the first insulating film, and provided with a protruding band part that has a line width narrower than a line width of the capacitance wiring line and that is arranged along the capacitance wiring line, and wherein the pixel electrodes are formed on the second insulating film such that the outer edges of the pixel electrodes adjacent to each other respectively ride up on the protruding band part.

The active matrix substrate may be configured such that the protruding band part includes two end parts and a middle part interposed therebetween, and a height of the end parts is set lower than a height of the middle part.

The active matrix substrate may be configured such that the protruding band part includes two end parts and a middle part interposed therebetween, and a line width of the end parts is set narrower than a line width of the middle part.

In the active matrix substrate, it is preferable for end parts of the pixel electrodes to have a belt shape that extends along each of the capacitance wiring lines, and to have cut-out parts at both ends on an end part of the belt shape.

A display panel according to the present invention is provided with the active matrix substrate.

A display device according to the present invention is provided with an illumination device, and the display panel that uses light from the illumination device to perform a display.

A television receiver according to the present invention is provided with the display device.

Effects of the Invention

According to the present invention, it is possible to provide an active matrix substrate where it is possible to set a narrow distance between pixel electrodes adjacent to each other across a capacitance wiring line; a display panel provided with the substrate; a display device provided with the display panel, and a television receiver provided with the display device.

DETAILED DESCRIPTION OF EMBODIMENTS

Embodiment 1

Embodiment 1 of the present invention will be explained with reference to FIGS. 1 to 18. In the present embodiment, an active matrix substrate in a liquid crystal panel used in a liquid crystal display device 10 is shown by example. The upper side of FIG. 2 is the front side, and the lower side is the rear side.

Figure 1:
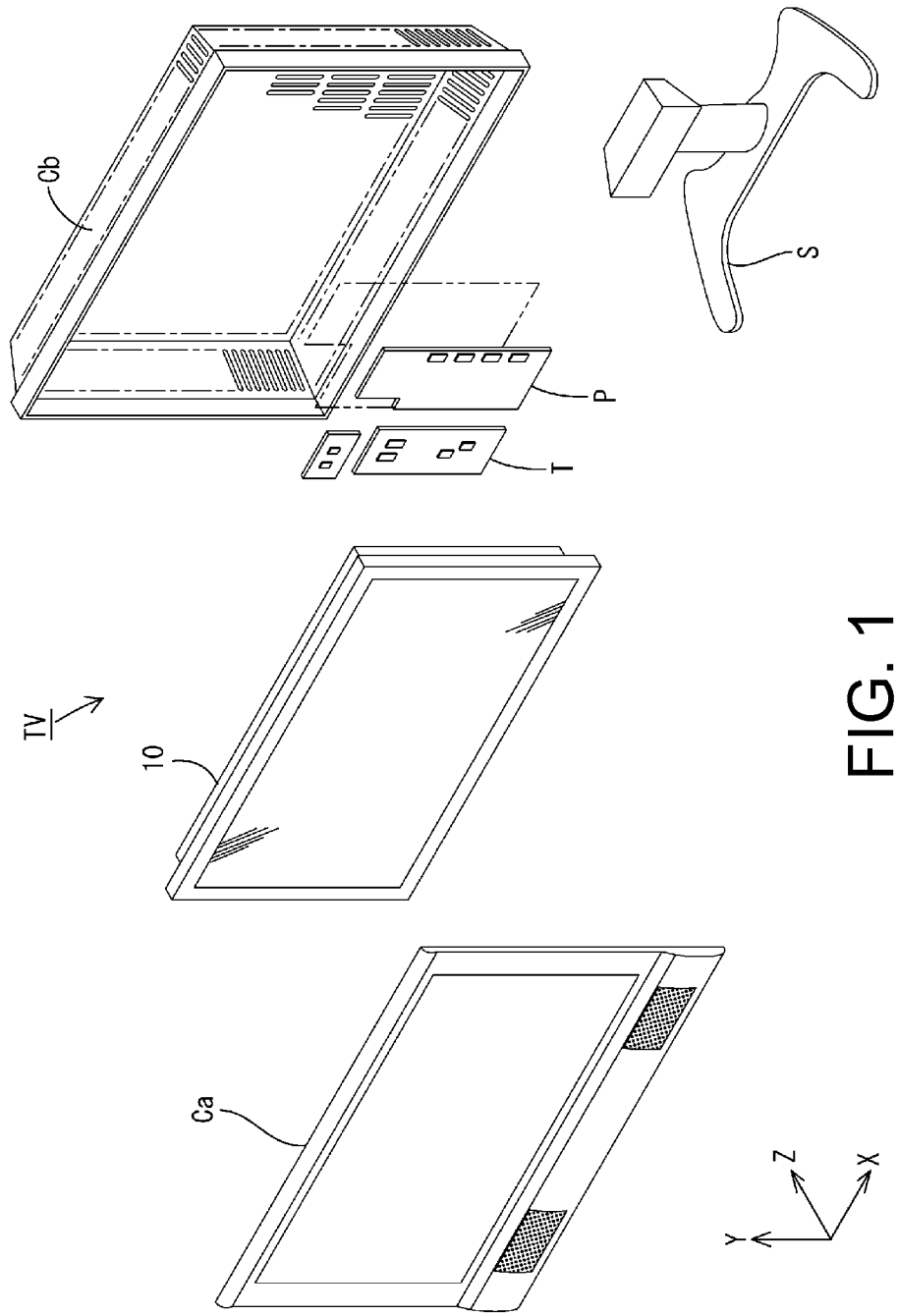
FIG. 1 is an exploded perspective view that shows a schematic configuration of a television receiver according to Embodiment 1.
Figure 2:
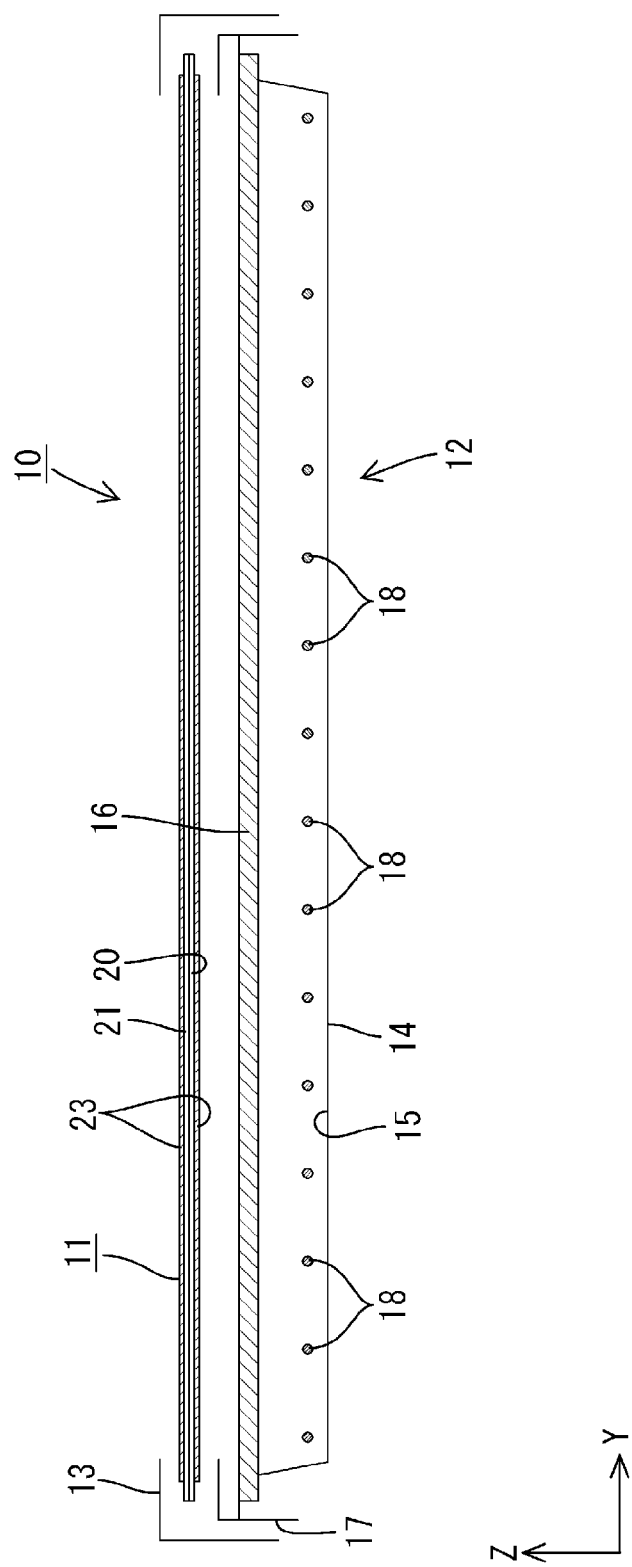
FIG. 2 is a cross-sectional view that schematically shows a cross-sectional configuration of a liquid crystal display device.

FIG. 1 is an exploded perspective view showing a schematic configuration of a television receiver according to Embodiment 1. FIG. 2 is a cross-sectional view schematically showing a cross-sectional configuration of a liquid crystal display device. As shown in FIG. 1, a television receiver TV includes a liquid crystal display device (a display device) 10, a front and a back cabinet Ca and Cb that sandwich the liquid crystal display device 10 to store it, a power source P, a tuner T, and a stand S. The liquid crystal display device 10 has a horizontal quadrilateral shape as a whole, and as shown in FIG. 2 is provided with a liquid crystal panel 11, which is a display panel, and a backlight device (an illumination device) 12, which is an external light source. These are formed so as to be integrally held together by a bezel 13 or the like.

The backlight device 12 is formed so as to have a light source arranged directly below the back side of the liquid crystal panel 11, and is a so-called direct-lit type. The backlight device 12 is formed by having: a chassis 14 that is open on the front side (the light-exiting side, the liquid crystal panel 11 side); a reflective sheet (a reflective member) 15 laid inside this chassis 14; an optical member 16 installed in the open portion of the chassis 14; a frame 17 for holding the optical member 16; a plurality of cold cathode fluorescent lamps (light sources) 18 stored in a parallel state inside the chassis 14; and a lamp holder (not shown) that shields the end parts of the cold cathode fluorescent lamps 18 from light and that has light reflection properties.

The liquid crystal panel 11 mainly includes a transparent array substrate (an active matrix substrate) 20, a transparent opposite substrate (a color-filter substrate) 21 that is arranged so as to oppose this array substrate 20, and a liquid crystal layer sealed between these. This liquid crystal layer contains a liquid crystal material, which is a substance having optical characteristics that change according to an applied electrical field. The array substrate 20 is arranged on the rear side (the backlight device 12 side) of the liquid crystal panel 11, and the opposite substrate 21 is arranged on the front side (the light-exiting side) of that. A pair of front and rear polarizing plates 23 and 23 is bonded on the respective outer surfaces of the two substrates 20 and 21.

Figure 3:
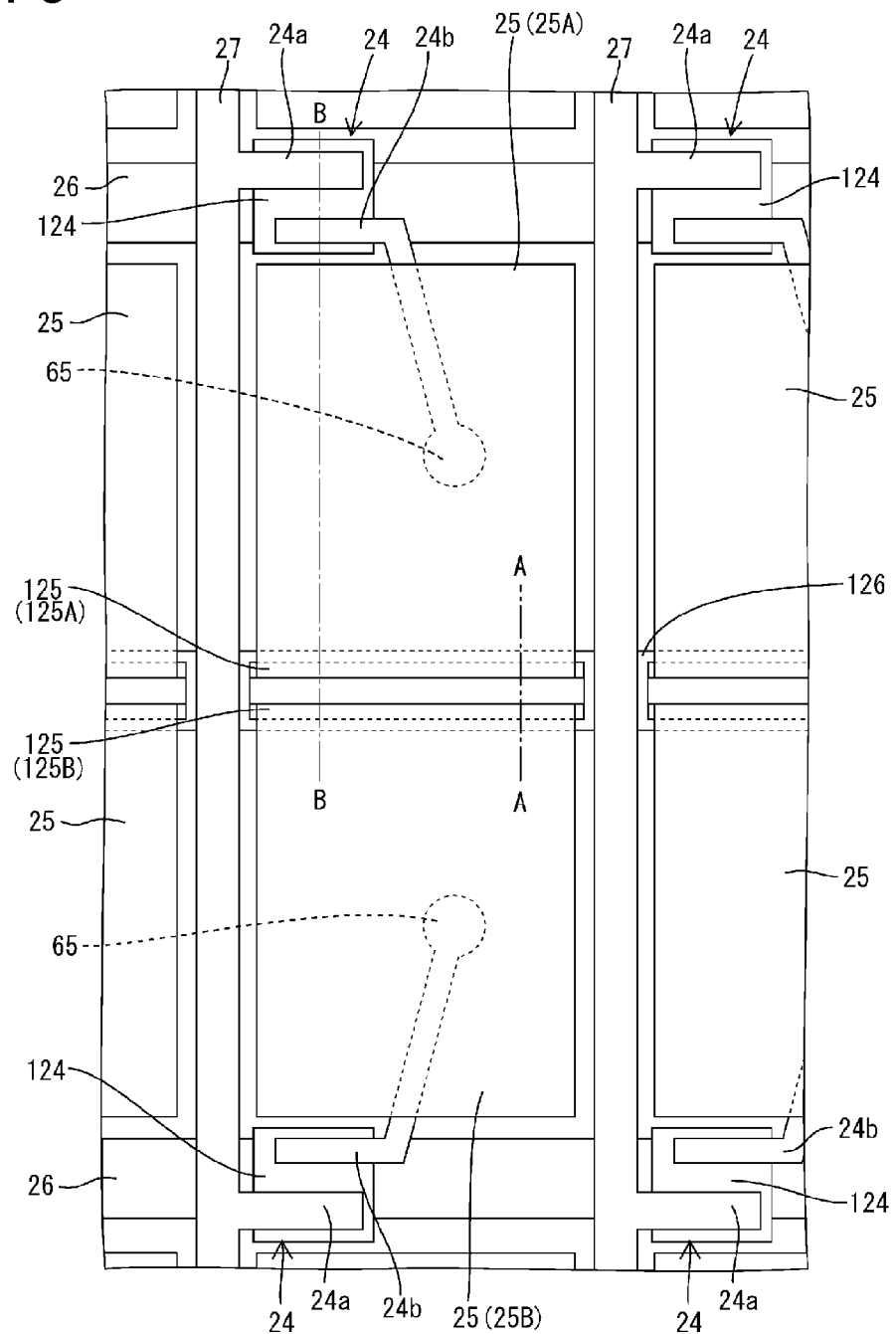
FIG. 3 is a plan view that schematically shows a pixel configuration in an array substrate of a liquid crystal panel.

The array substrate 20 will be explained below. FIG. 3 is a plan view schematically showing a pixel configuration of the array substrate of the liquid crystal panel. The array substrate 20 includes a transparent glass substrate (hereinafter, a transparent substrate), and a plurality of thin-film transistors (hereinafter, TFTs) 24, pixel electrodes 25, and the like arranged in a matrix on the inner surface side (the liquid crystal layer side, the surface side opposing the opposite substrate) of the transparent substrate. The TFTs 24 are used as switching elements, and the pixel electrodes 25 are electrically connected to these TFTs 24. The TFTs 24 are made of a semiconductor element, and contain a semiconductor film 124 made of amorphous silicon (a-Si) or the like. The pixel electrodes 25 are made of a transparent conductive film such as ITO (indium tin oxide), for example.

Each pixel is assigned one TFT 24 and one pixel electrode 25. The pixel electrode 25 assigned to each pixel is demarcated by a gate wiring line 26, a capacitance wiring line 126, and source wiring lines 27 formed on the inner surface side of the transparent substrate. The gate wiring lines 26 supply scan signals to the TFT 24 of each pixel, the capacitance wiring lines 126 supply electrical signals for forming capacitance for each pixel, and the source wiring lines 27 supply image signals to each pixel. These wiring lines 26, 126, and 27 are all made of a conductive material.

A plurality of the gate wiring lines 26 are formed on the inner surface side of the transparent substrate so as to line up in parallel with each other. A plurality of the capacitance wiring lines 126 are formed on the inner surface side of the transparent substrate so as to be arranged between the gate wiring lines 26 and 26 adjacent to each other. A plurality of the source wiring lines 27 are formed on the inner surface side of the transparent substrate so as to respectively intersect the gate wiring lines 26 and the capacitance wiring lines 126.

The TFT 24 assigned to each pixel is disposed so as to oppose the gate wiring line 26 via a first insulating film, as described later. The TFT 24 includes a source electrode 24a and a drain electrode 24b, and the source electrode 24a is connected to the source wiring line 27, and the drain electrode 24b is connected to the pixel electrode 25.

The pixel electrode 25 (25A) shown in FIG. 3 is surrounded by the gate wiring line 26 and the capacitance wiring line 126, which run in parallel with each other, and the two source wiring lines 27 and 27 that are formed so as to intersect these, for example. As shown in FIG. 3, the pixel electrodes 25 of the present embodiment have a rectangular shape as a whole in a plan view, and a portion 125 (125A) that corresponds to one side of the outer edges of the pixel electrode 25 is arranged so as to overlap the capacitance wiring line 126 via the first insulating film and the like, as described later.

Another pixel electrode 25B, which is adjacent to the pixel electrode 25A described above across the capacitance wiring line 126, is also arranged so that the outer edge 125 (125B) thereof overlaps the capacitance wiring line 126.

Figure 4:
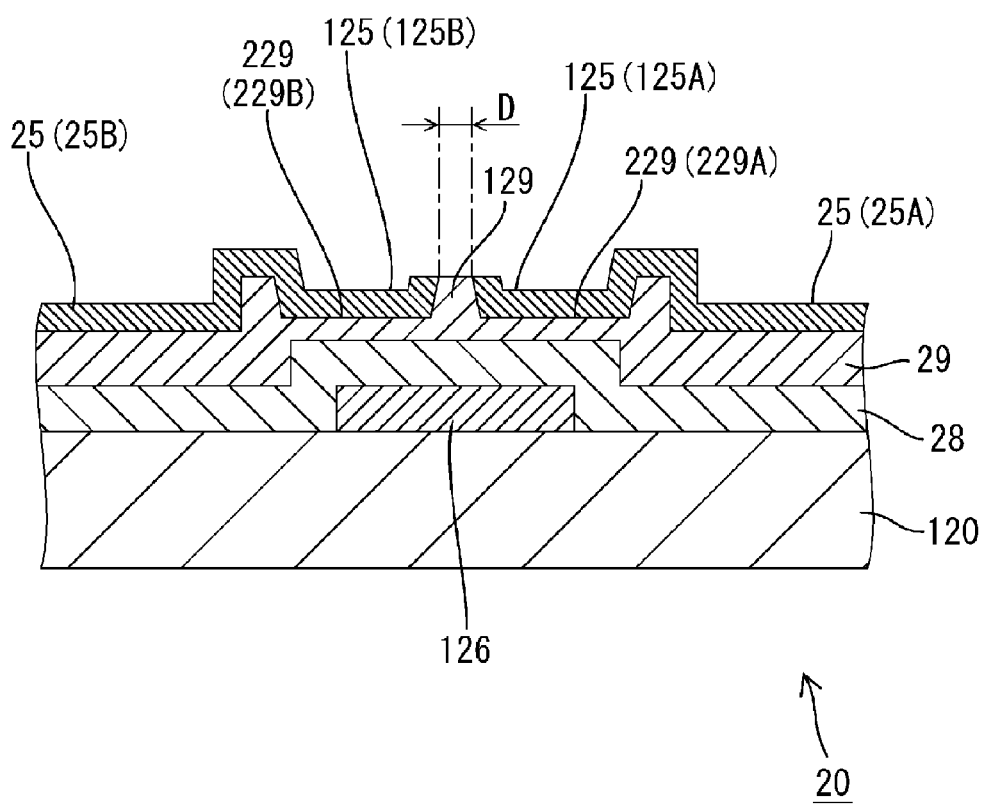
FIG. 4 is a cross-sectional view along the line A-A on the array substrate shown in FIG. 3.

FIG. 4 is a cross-sectional view along the line A-A on the array substrate shown in FIG. 3. As shown in FIG. 4, the array substrate 20 has the capacitance wiring line 126 formed on a transparent substrate 120, and a first insulating film 28 is formed on the transparent substrate 120 so as to cover the capacitance wiring line 126. A second insulating film (an interlayer insulating film) 29 is formed so as to cover this first insulating film 28. A protruding band part 129 is disposed on a portion of the second insulating film 29 covering the capacitance wiring line 126. This protruding band part 129 is a part of the second insulating film 29, and is a linear protrusion that extends along the wiring line direction of the capacitance wiring line 126. The protruding band part 129 of the present embodiment is arranged in the center of the capacitance wiring line 126.

The protruding band part 129 of the present embodiment is interposed between two grooves 229 (229A and 229B). These grooves 229 (229A and 229B) are engraved into the surface of the second insulating film 29.

As shown in FIG. 4, the pixel electrodes 25 (25A and 25B) are formed so as to cover the second insulating film 29. The outer edges 125 (125A and 125B) of the pixel electrodes 25 are formed so as to ride up on the protruding band part 129. The outer edge 125A of the pixel electrode 25A, and the outer edge 125B of the adjacent pixel electrode 25B face each other while maintaining a distance (a gap) D across the protruding band part 129. The outer edges 125 of the pixel electrodes 25 are disposed so as to oppose the capacitance wire line 126 via the second insulating film 29 and the like. In other words, the outer edges 125 of the pixel electrodes 25 overlap the capacitance wiring line 126 in a plan view of the array substrate 20.

A terminal part from the gate wiring lines 26, a terminal part from the source wiring lines 27, and a terminal part from the capacitance wiring lines 126 are each disposed on an end part of the array substrate 20, and each of these terminal parts has signals inputted from external circuits, thereby controlling the driving of the TFT 24 in each pixel. An alignment film for aligning liquid crystal molecules in the liquid crystal layer is formed on the inner surface side of the array substrate 20.

Next, the opposite substrate 21 will be explained. The opposite substrate 21 has a plurality of color filters arranged in a matrix on a transparent glass substrate. These color filters are disposed so as to oppose respective pixel electrodes 25 on the array substrate 20, and are demarcated by a grid-shaped black matrix (a light-shielding part). This black matrix is disposed so as to oppose the gate wiring lines 26, the capacitance wiring lines 126, and the source wiring lines 27 on the array substrate 20. An alignment film for aligning liquid crystal molecules inside the liquid crystal layer is also formed on the inner surface side of the opposite substrate 21.

Manufacturing steps for the array substrate 20 will be explained below. The manufacturing process of the array substrate 20 of the present embodiment uses a total of four photomasks. Specifically, a first photomask is used to form the patterned gate wiring lines 26 and capacitance wiring lines 126, a second photomask is used to form the patterned source electrodes 24a, drain electrodes 24b, source wiring lines 27 and semiconductor films 124, a third photomask is used to form the patterned second insulating film, and a fourth photomask is used to form the patterned pixel electrodes 25.

In the present embodiment, a half-tone mask that contains a semi-transmissive film capable of changing the exposure amount for each area, or a gray-tone mask that contains semi-transmissive areas using slits, is used as the second photomask and the third photomask. Each manufacturing step of the array substrate 20 is explained in detail below with reference to FIGS. 5 to 18. FIGS. 5 to 18 show a portion corresponding to the cross-section along the line B-B on the array substrate 20 shown in FIG. 3.

Figure 5:
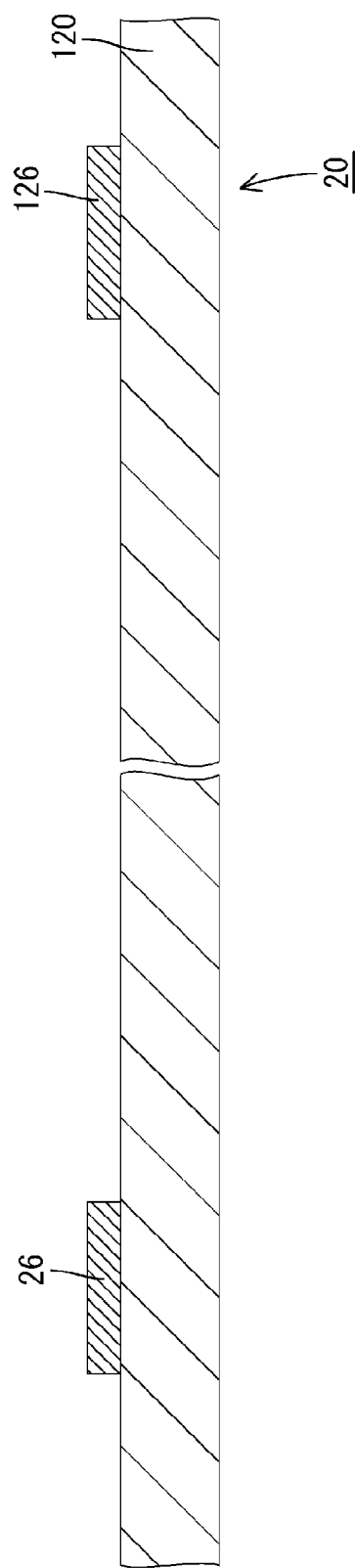
FIG. 5 is a view showing a step to form a gate wiring line and a capacitance wiring line on a transparent substrate.

FIG. 5 is a view showing a step to form the gate wiring line and the capacitance wiring line on the transparent substrate. First, the surface of the transparent substrate 120, which acts as the base portion of the array substrate 20, is cleaned. Afterwards, a metal film with a prescribed thickness is formed on the front surface of the dried transparent substrate 120. This metal film is formed using sputtering, for example. The metal film is made of a single body (single layer) metal film made of aluminum (Al), chromium (Cr), tantalum (Ta), titanium (Ti), copper (Cu), or the like, a multilayer material where a metal nitride has been layered onto these, or the like, for example.

Next, photoresist is coated onto the metal film, and a photoresist layer (a first photoresist layer) is formed on the entire surface of the metal film. Afterwards, the photoresist layer is exposed to light via the first photomask. The first photomask has a first pattern formed therein made of a transmissive part and a light-shielding part. After exposure, a developing solution is used to develop the photoresist layer, thereby forming a pattern based on the first pattern in the photoresist layer. The metal film is etched (wet etched or dry etched, for example) with the patterned photoresist layer as the mask. As a result, as shown in FIG. 5, the respectively patterned gate wiring line 26 and capacitance wiring line 126 are formed on the transparent substrate 120.

Figure 6:
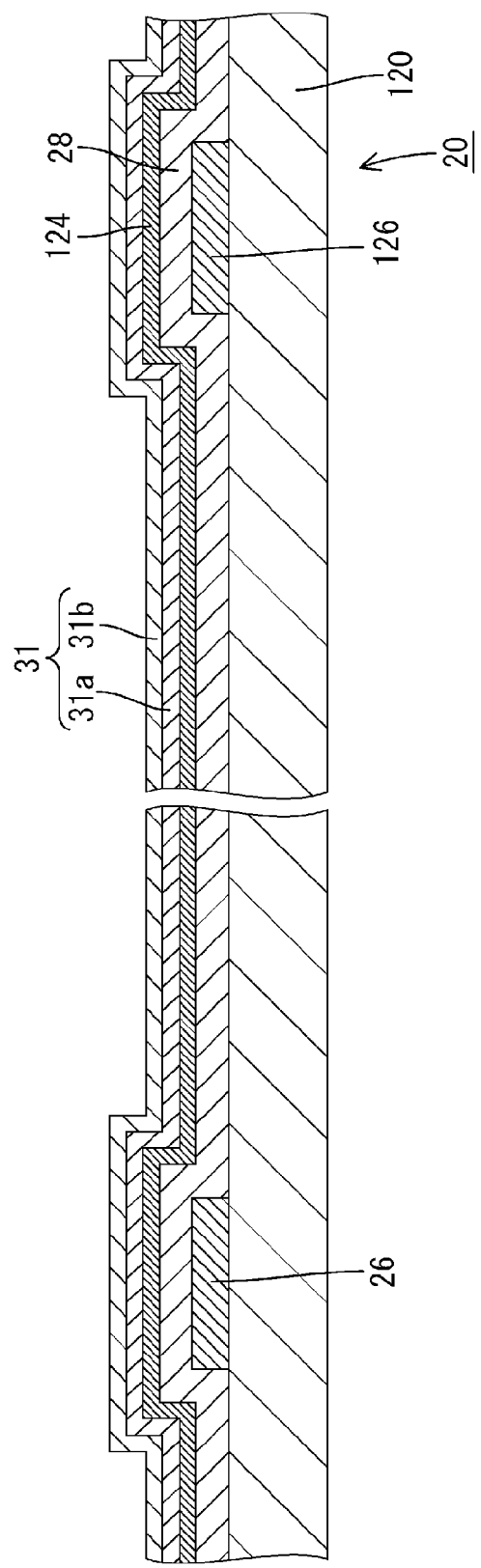
FIG. 6 is a view showing a step to form a first insulating film, a semiconductor film, and a conductive film on the transparent substrate.

FIG. 6 is a view showing a step to form the first insulating film, the semiconductor film, and the conductive film on the transparent substrate. As shown in FIG. 6, the first insulating film 28, the semiconductor film 124, and a conductive film 31 are layered in this order on the transparent substrate 120, which has the gate wiring line 26 and the capacitance wiring line 126 formed thereon. Among these, the conductive film 31 has a double-layer structure and includes a lower layer first conductive film 31a made of a doped semiconductor film, and an upper layer second conductive film 31b made of a metal film.

The first insulating film 28 is made of a so-called gate insulating film, and is formed on the transparent substrate 120 so as to cover the gate wiring line 26 and the capacitance wiring line 126. The first insulating film 28 is formed using a CVD (chemical vapor deposition) method such as plasma-enhanced CVD, for example. The semiconductor film 124 is made of amorphous silicon (a-Si) or the like, for example.

The first conductive film 31a is formed by sputtering, for example. The first conductive film 31a is made of amorphous silicon (n+Si) or the like doped with an n-type impurity such as phosphorous (P) at a high concentration, for example. The second conductive film 31b is formed by sputtering, for example. The second conductive film 31b is made of a single body (single layer) metal film made of aluminum (Al), chromium (Cr), tantalum (Ta), titanium (Ti), copper (Cu), or the like, a multilayer material where a metal nitride has been layered onto these, or the like, for example.

Next, photoresist is coated onto the second conductive film 31b, and a photoresist layer (a second photoresist layer) is formed on the entire surface of the second conductive film 31b. Afterwards, this photoresist layer is exposed to light via the second photomask. The second photomask is made of the half-tone mask or gray-tone mask as described above. A second pattern made of a transmissive part, a semi-transmissive part with less transmission than the transmissive part, and a light-shielding part are formed in this second photomask. After exposure, a developing solution is used to develop the photoresist layer, thereby forming a pattern based on the second pattern in the photoresist layer.

Figure 7:
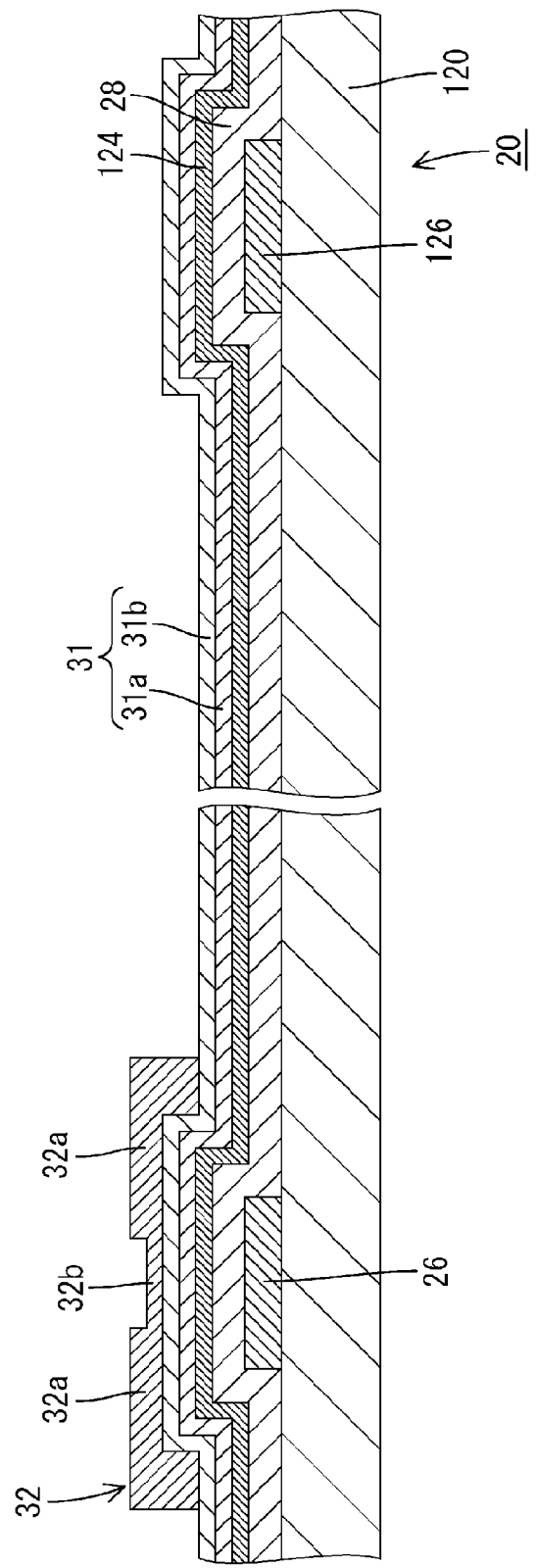
FIG. 7 is a view showing a step to form a patterned photoresist layer on a second conductive film.

FIG. 7 is a view showing a step to form a patterned photoresist layer on the second conductive film. As shown in FIG. 7, a photoresist layer 32 includes a thickest portion 32a, and a portion 32b that is thinner than the portion 32a and that has a depressed surface. When using a positive photoresist, during exposure the thickest portion 32a corresponds to the light-shielding part of the second photomask, and the portion 32b corresponds to the semi-transmissive part, for example. The portions where the photoresist layer 32 are not formed on the second conductive film 31b correspond to the transmissive part of the second photomask.

The portion 32a of the photoresist layer 32 corresponds to the source electrode 24a and the drain electrode 24b, and the portion 32b corresponds to the opening area of the TFT 24 formed between the source electrode 24a and the drain electrode 24b.

Figure 8:
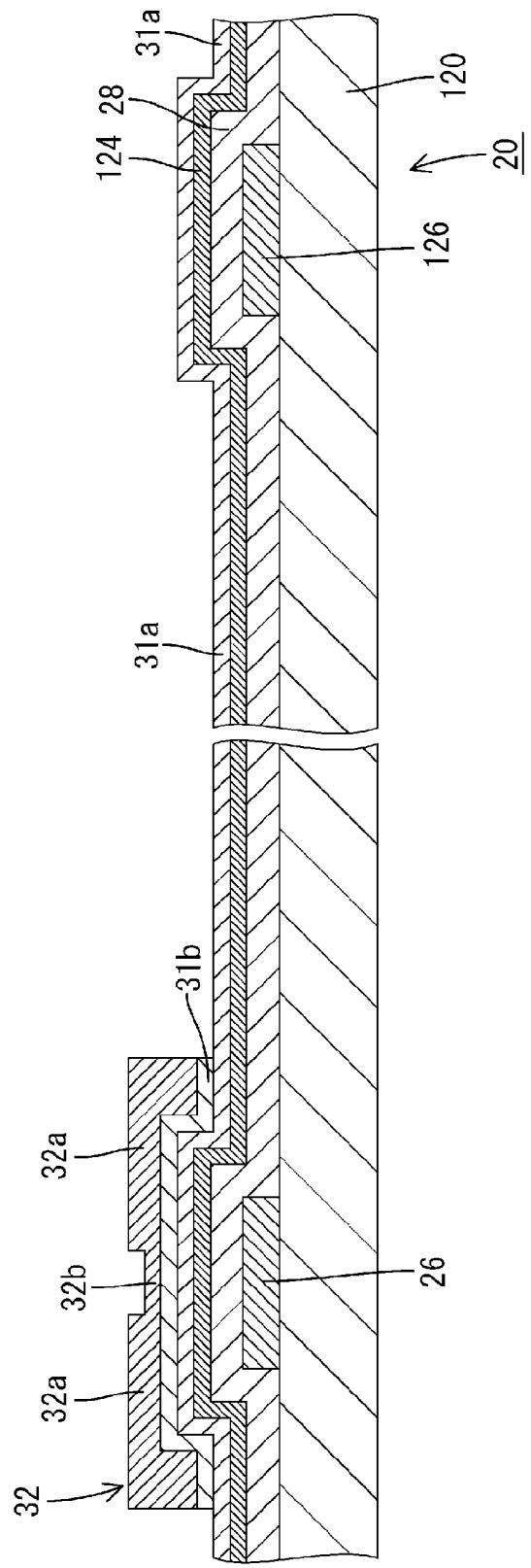
FIG. 8 is a view showing a step to wet etch the second conductive film.

Next, etching is done in two stages on the conductive film 31 and the semiconductor film 124 with the patterned photoresist layer 32 as the mask. First, wet etching is performed on the second conductive film 31b in the upper layer of the conductive film 31. FIG. 8 is a view showing the step to wet etch the second conductive film. As shown in FIG. 8, the portions of the second conductive film 31b (see FIG. 7) not covered by the photoresist layer 32 are removed by wet etching, and the portions of the second conductive film 31b covered by the photoresist layer 32 remain after wet etching.

Figure 9:
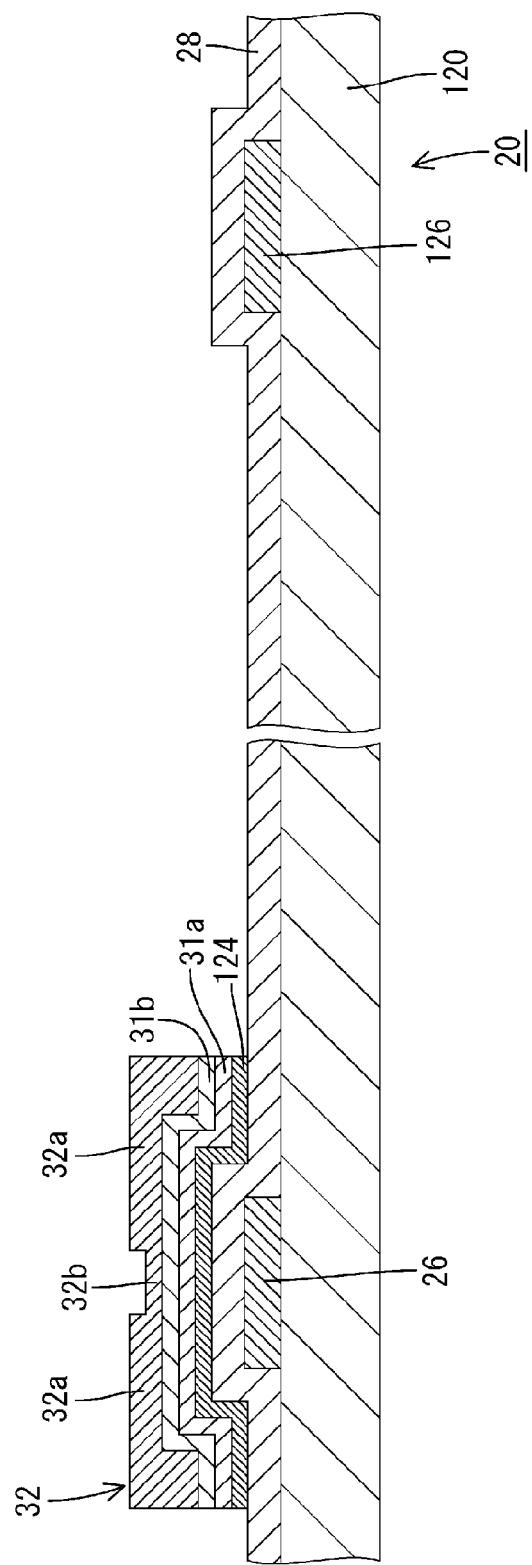
FIG. 9 is a view showing a step to dry etch the first conductive film and the semiconductor film.

Next, dry etching is performed on the first conductive film 31a and the semiconductor film 124 with the photoresist layer 32 as the mask. FIG. 9 is a view showing the step to dry etch the first conductive film and the semiconductor film. As shown in FIG. 9, the portions of the first conductive film 31a and the semiconductor film 124 not covered by the photoresist layer 32 (see FIG. 8) are removed by dry etching, and the portions of the first conductive film 31a and the semiconductor film 124 covered by the photoresist layer 32 remain after dry etching.

Figure 10:
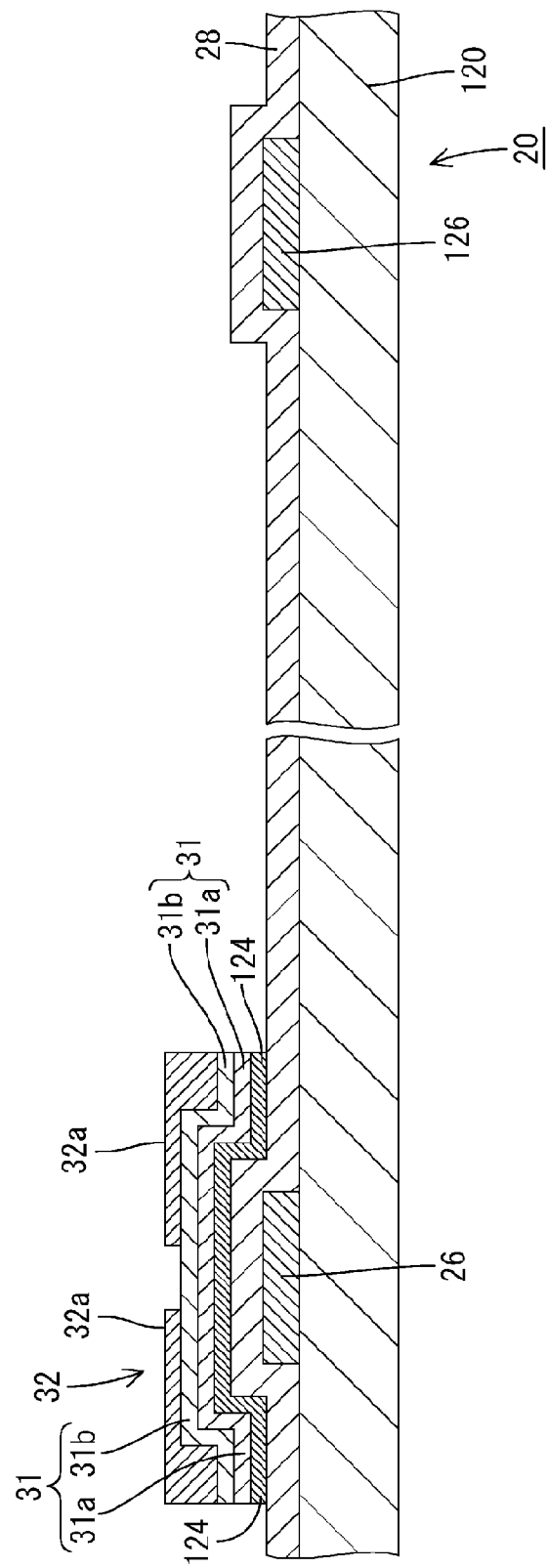
FIG. 10 is a view showing a step to perform ashing on the photoresist layer.

After etching is performed in two stages using the photoresist layer 32 as described above, ashing is performed on the photoresist layer 32. This ashing removes the thin portion 32b of the photoresist layer 32. Oxygen plasma is used for the ashing, for example. FIG. 10 is a view showing the step to perform ashing on the photoresist layer. As shown in FIG. 10, the thin portion 32b (see FIG. 9) of the photoresist layer 32 is scraped and removed. The portion 32a of the photoresist layer 32 is scraped by ashing to be made thinner.

Figure 11:
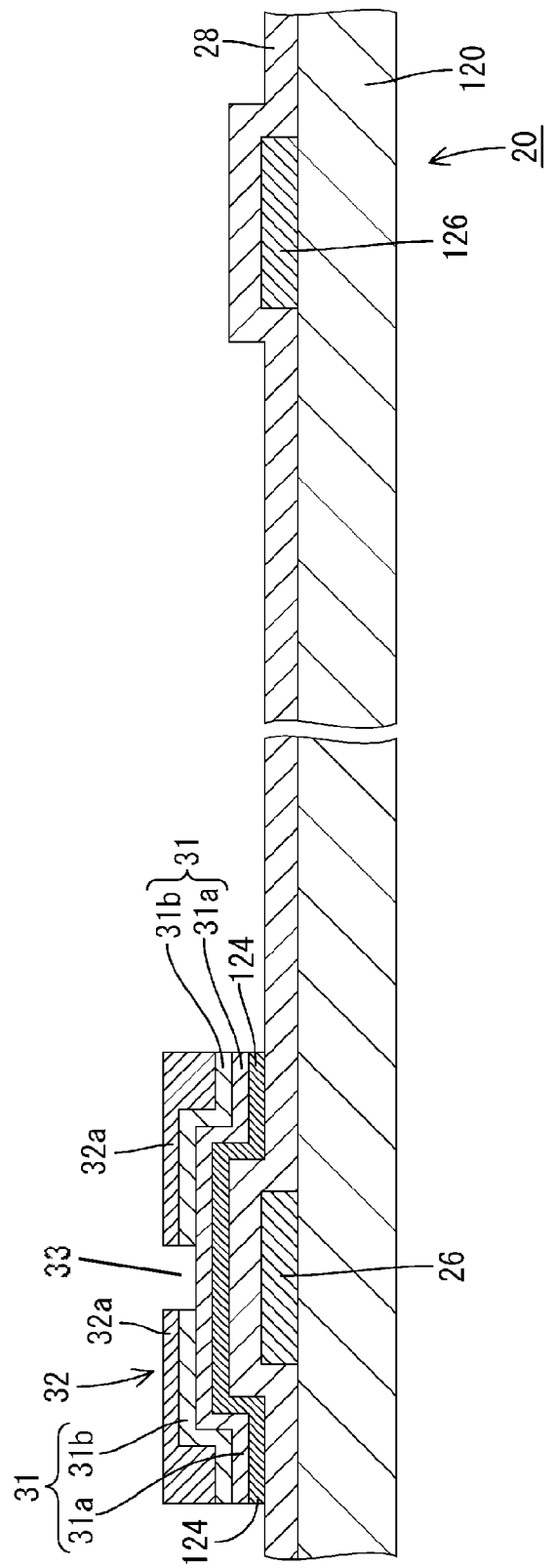
FIG. 11 is a view showing a step to wet etch a portion of the second conductive film corresponding to an opening area.

Next, etching is done in two stages on the conductive film 31 and the semiconductor film 124 with the photoresist layer 32, after ashing, as the mask. First, wet etching is performed on the second conductive film 31b in the upper layer of the conductive film 31. FIG. 11 is a view showing the step to wet etch the portion of the second conductive film corresponding to the opening area. As shown in FIG. 11, the portion of the second conductive film 31b corresponding to the opening area 33 and not covered by the photomask 32 is removed by wet etching. The portion of the second conductive film 31b covered by the photomask layer 32 remains after wet etching.

Figure 12:
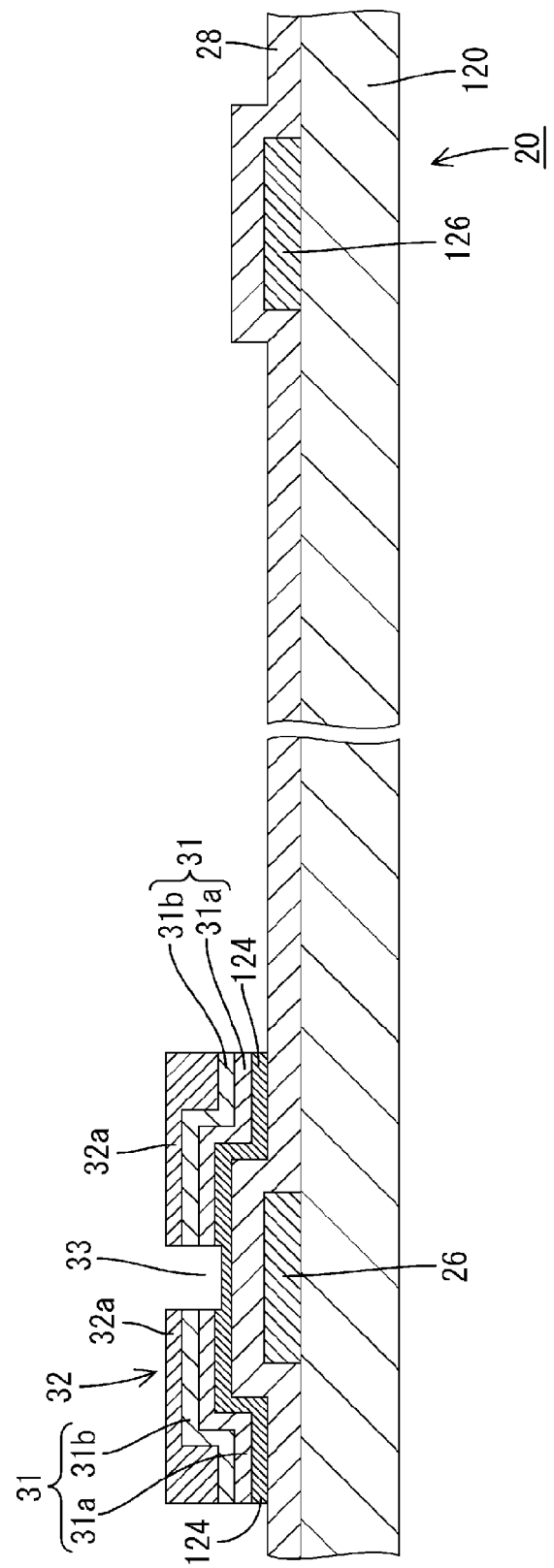
FIG. 12 is a view showing a step to dry etch a portion of the first conductive film and the semiconductor film corresponding to the opening area.

Next, dry etching is performed on the first conductive film 31a and the semiconductor film 124 with the photoresist layer 32 as the mask. FIG. 12 is a view showing a step to dry etch a portion of the first conductive film and the semiconductor film corresponding to the opening area. As shown in FIG. 12, the portion of the first conductive film 31a corresponding to the opening area 33 and not covered by the photoresist layer 32 is removed by dry etching. The portion of the semiconductor film 124 corresponding to the opening area 33 has the surface thereof slightly scraped by dry etching, and the thickness thereof is reduced by the amount scraped. The portion of the first conductive film 31a and the semiconductor film 124 covered by the photomask layer 32 remains after dry etching.

Figure 13:
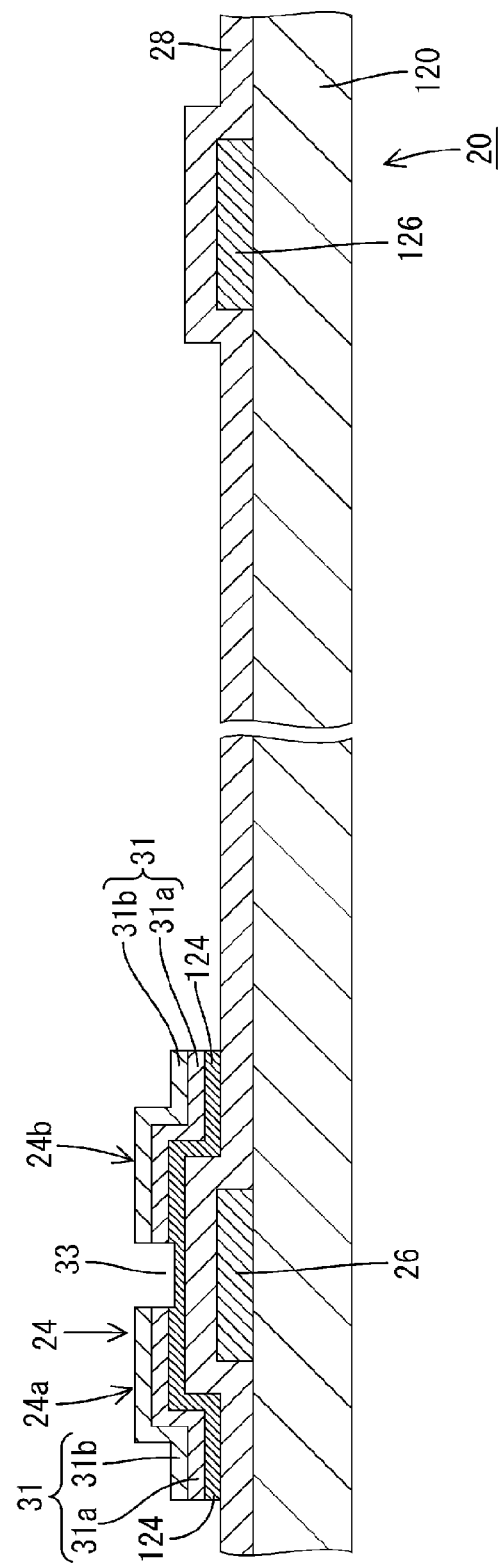
FIG. 13 is a view showing a step to perform ashing on the photoresist layer on the second conductive film.

Afterwards, oxygen plasma or the like is used to perform ashing on the photoresist layer 32, thereby removing the photoresist layer 32 from the second conductive film 31b. FIG. 13 is a view showing the step to perform ashing on the photoresist layer on the second conductive film. As shown in FIG. 13, ashing removes the photoresist layer 32 from the second conductive film 31b. As a result, the TFT 24 is formed above the gate wiring line 26. This TFT 24 includes the source electrode 24a made of the first conductive film 31a and the second conductive film 31b, which are disposed on the semiconductor film 124, and the drain electrode 24b also made of the first conductive film 31a and the second conductive film 31b.

Figure 14:
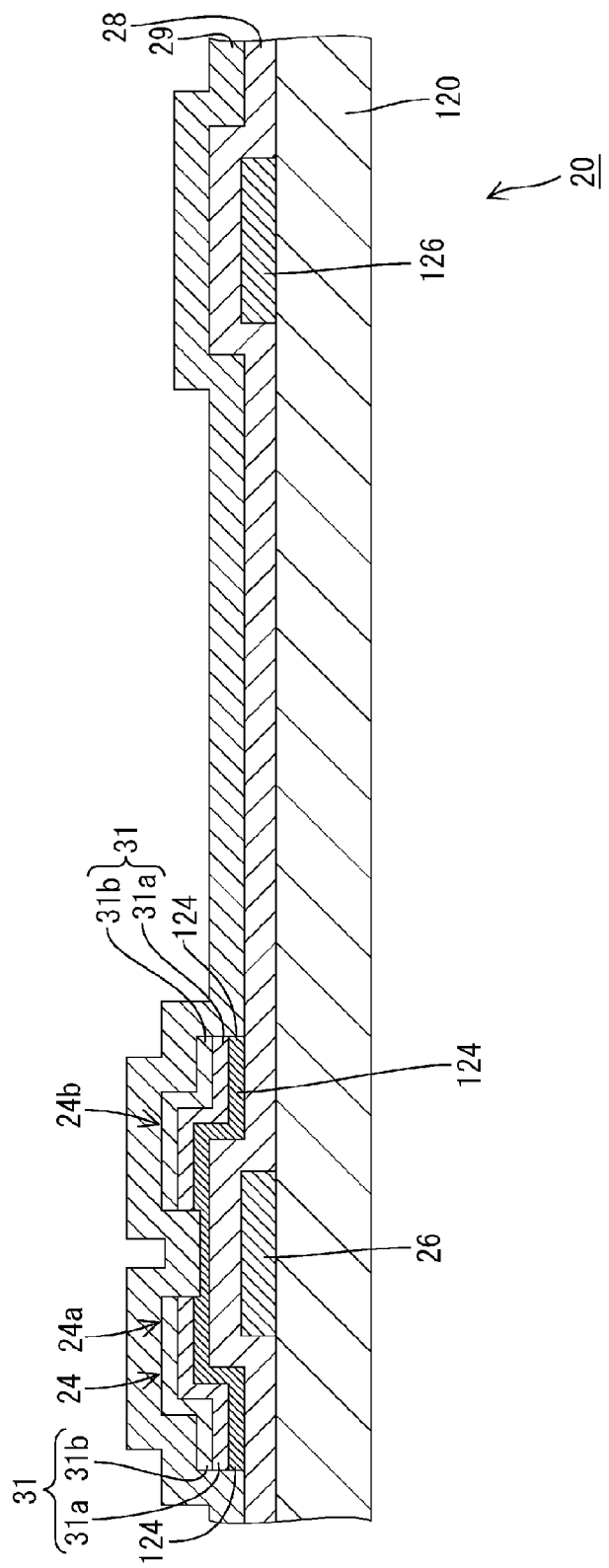
FIG. 14 is a view showing a step to form a second insulating film on the array substrate.

After the TFT 24 is formed as described above, the second insulating film (the interlayer insulating film) 29, which has a prescribed thickness, is formed on the array substrate 20. FIG. 14 is a view showing the step to form the second insulating film on the array substrate 20. As shown in FIG. 14, the second insulating film 29 is formed so as to cover the TFT 24 and the first insulating film 28 formed on the array substrate 20. The second insulating film 29 is formed using plasma-enhanced CVD, for example. The second insulating film 29 is made of an inorganic material such as silicon nitride (SiNx), an acrylic resin material, or the like, for example.

Figure 15:
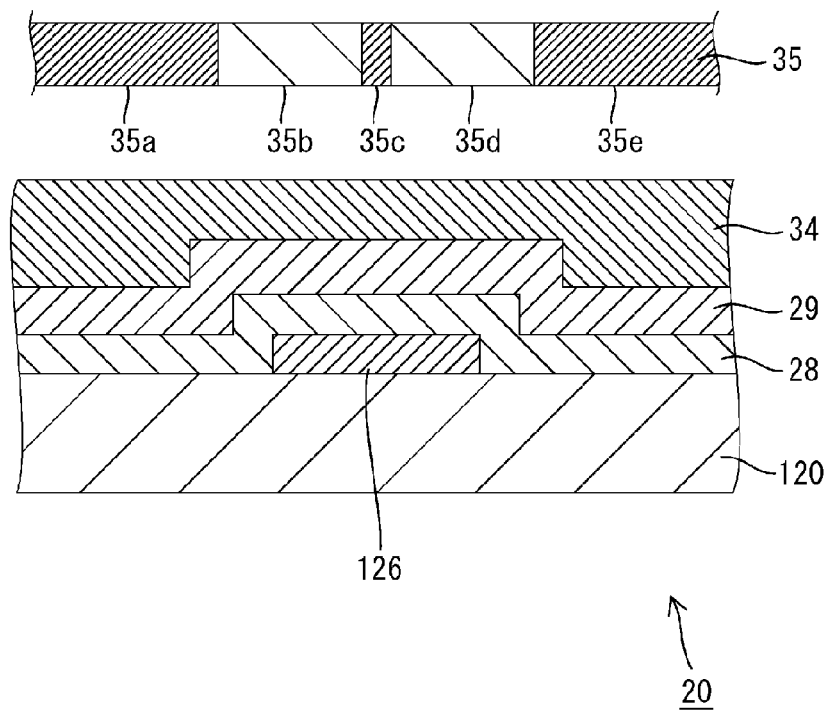
FIG. 15 is a view showing a step to expose the photoresist layer formed on the second insulating film to light via a third photomask.

Next, photoresist is coated onto the second insulating film 28, and a photoresist layer (a third photoresist layer) is formed on the entire surface of the second insulating film 28. Afterwards, this photoresist layer is exposed to light via the third photomask. FIG. 15 is a view showing the step to expose the photoresist layer formed on the second insulating film 28 to light via the third photomask. FIG. 15 shows a cross-sectional view in the vicinity of the capacitance wiring line 126. A third photomask 35 is a half-tone mask or a gray-tone mask, as described above. A third pattern made of a transmissive part, a semi-transmissive part with less transmission than the transmissive part, and a light-shielding part are formed in the third photomask 35.

Figure 16:
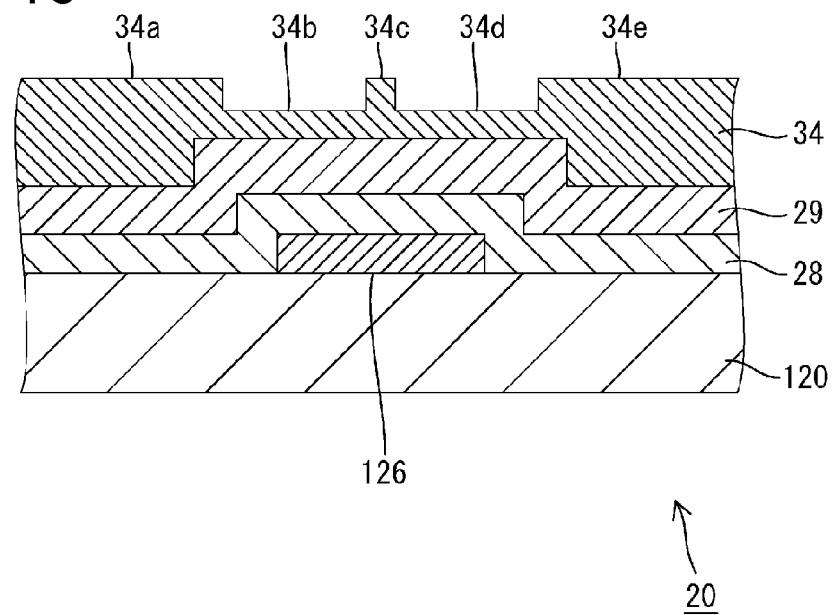
FIG. 16 is a view showing a step to develop the photoresist layer after exposure.

As shown in FIG. 15, the third photomask 35, which is used to expose a photoresist layer 34 in the vicinity of the capacitance wiring line 126 to light, has light-shielding parts 35a, 35c, and 35e, and semi-transmissive parts 35b and 35d. FIG. 16 is a view showing a step to develop the photoresist layer 34 after exposure. When the photoresist layer 34 is developed with a developing solution after exposure, a pattern based on the third pattern is formed on the photoresist layer 34.

When using a positive photoresist, portions 34b and 34d of the photoresist layer 34 corresponding to the semi-transmissive areas 35b and 35d (see FIG. 15) become thinner after being developed than do portions 34a, 34c, and 34e of the photoresist layer 34 corresponding to the light-shielding parts 35a, 35c, and 35e (see FIG. 15), and a pattern with recesses and protrusions is formed on the surface of the photoresist layer 34. As shown in FIG. 16, the portion 34c of the photoresist layer 34 is located between the portions 34b and 34d, which are depressed into grooves, and the portion 34c has a raised shape. A portion of the photoresist layer 34 corresponding to the transmissive part of the third photomask 35 is removed after developing. This portion is used in the formation of the contact holes, as described later.

Figure 17:
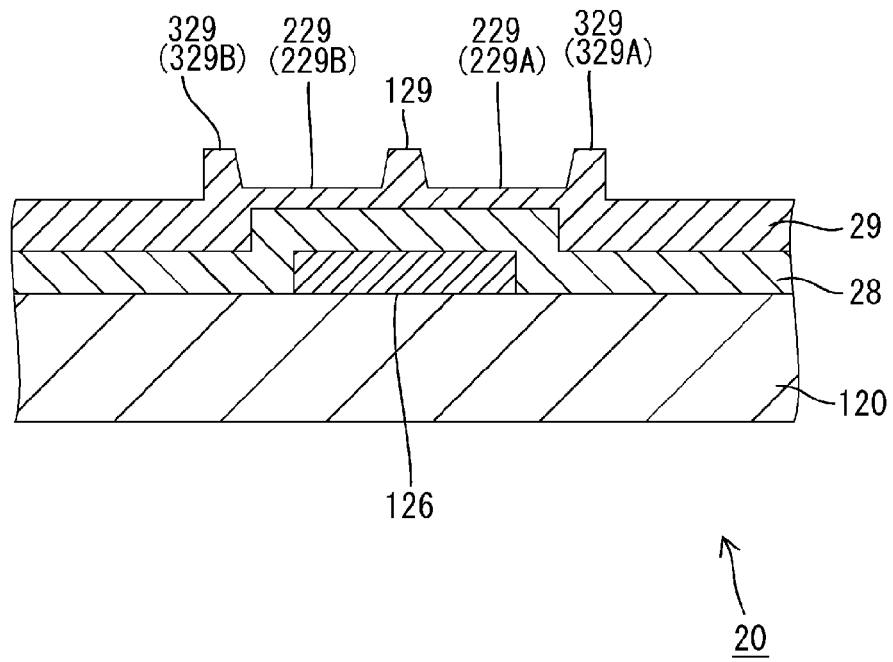
FIG. 17 is a view showing the etched second insulating film.

The second insulating film 29 is etched with the photoresist layer 34, which has been patterned as described above, as the mask. Wet etching or dry etching is used for the etching. After etching, the photoresist layer 34 is removed by ashing. FIG. 17 is a view showing the etched second insulating film 29. The grooves 229 (229A and 229B) are formed on portions of the second conductive film 29 covered by the thin portions 34b and 34d of the photoresist layer 34. The groove 229B is formed for the portion 34b, and the groove 229A is formed for the portion 34d of the photoresist layer 34.

The protruding band part 129 is formed on the second insulating film 29 where the thick portion 34c is located between the portion 34b and the portion 34d. In other words, when the groove 229A and the groove 229B are formed, the portion located between these remains and acts as the protruding band part 129. An outer protrusion part 329B along the groove 229B is formed on the outside (the opposite side of the protruding band part 129) of the groove 229B, and an outer protrusion part 329A along the groove 229A is formed on the outside (the opposite side of the protruding band part 129) of the groove 229A. The protruding band part 129 and the like are formed by the second insulating film 29 being patterned as such. Contact holes 65 or the like used for connecting the pixel electrodes 25 with the drain electrodes 24b are also formed in the second insulating film 29 (see FIG. 3).

Figure 18:
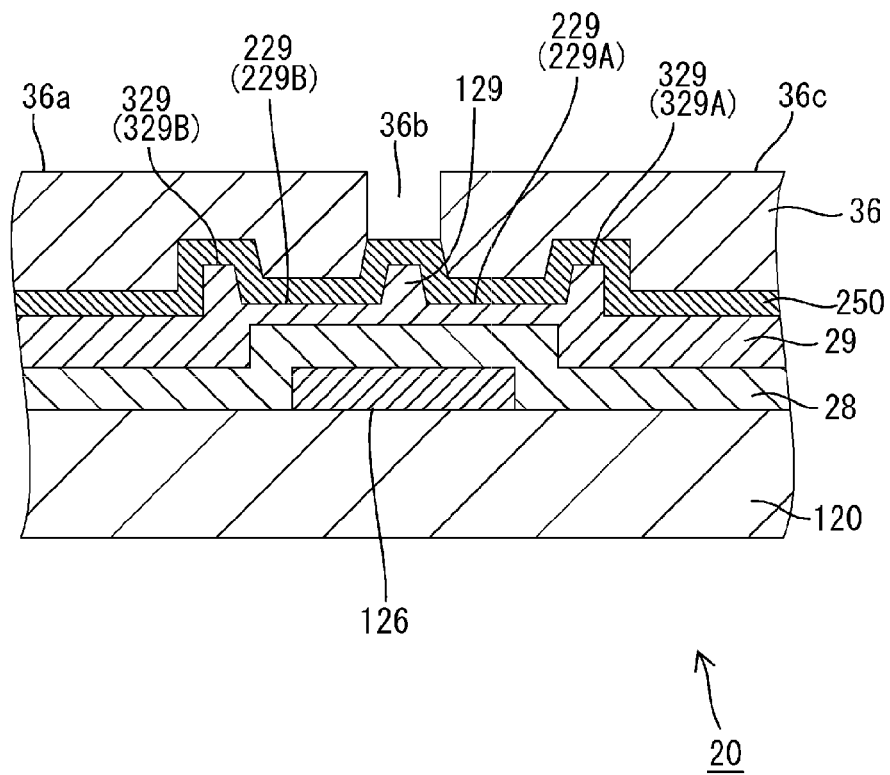
FIG. 18 is a view showing a step to pattern a transparent conductive film on the second insulating film to form a pixel electrode.

Next, a transparent conductive film with a prescribed thickness is formed on the patterned second insulating film 29. The transparent conductive film is formed by sputtering, for example. The transparent conductive film is made of ITO, for example. FIG. 18 is a view showing a step to form the pixel electrodes by patterning the transparent conductive film on the second insulating film. As shown in FIG. 18, a transparent conductive film 250 is formed on the second insulating film 29 so as to cover the protruding band part 129, the grooves 229, and the like. Photoresist is coated on this transparent conductive film 250, and a photoresist layer (a fourth photoresist layer) is formed on the entire surface thereof. This photoresist layer 36 is exposed to light via the fourth photomask. The fourth photomask has a fourth pattern made of a transmissive part and a light-shielding part.

After exposure, a developing solution is used to develop the photoresist layer 36, thereby forming a pattern based on the fourth pattern in the photoresist layer 36. As shown in FIG. 18, the photoresist layer 36 is made of the thick portions 36a and 36c, and the portion 36b arranged therebetween where the photoresist layer 36 has been removed. The portion 36b has the transparent conductive film 250 exposed, and the protruding band part 129 is arranged below the transparent conductive film 250.

The transparent conductive film 250 is etched with the photoresist layer 36 patterned as such as the mask. Wet etching or dry etching is used for the etching. This etching patterns the transparent conductive film 250 and removes a portion of the transparent conductive film 250 in the portion 36b, which is not covered by the photoresist layer 36. The protruding band part 129 is exposed from below the removed transparent conductive film 250. Afterwards, ashing is used to remove the photoresist layer 36, and as a result pixel electrodes 25 are obtained with the shape as shown in FIGS. 3 and 4.

The array substrate 20 of the present embodiment that has been manufactured through the manufacturing steps described above can have a narrow distance set between the pixel electrodes 25 (25A and 25B) adjacent to each other across the capacitance wiring line 126 (see FIGS. 3 and 4). The reason for that will be explained below.

The present embodiment, as shown in FIG. 3, has the outer edge 125 (125A) of the pixel electrode 25 (25A), and the outer edge 125 (125B) of the pixel electrode 25 (25B) disposed on the second insulating film 29 so as to overlap the capacitance wiring line 126 as much as possible. In other words, the outer edge 125B of the pixel electrode 25B is arranged so as to cover the surface (the bottom surface) of the groove 229B, and the outer edge 125A of the pixel electrode 25A is arranged so as to cover the surface (the bottom surface) of the groove 229A. The tip portions of the outer edges 125 are formed so as to ride up on the protruding band part 129 while maintaining the gap D across the protruding band part 129.

In other words, the outer edges 125 (125A and 125B) of the pixel electrodes 25 (25A and 25B) gradually rise from below to above the edges of the protruding band part 129. If the outer edges 125 (125A and 125B) of the pixel electrodes 25 (25A and 25B) are initially formed in such a state, then over time the outer edges 125 (125A and 125B) will slip slightly downwards from the ride-up state due to the weight thereof and the like. In other words, the outer edges 125 (125A and 125B) of the pixel electrodes 25 (25A and 25B) will over time become slightly farther apart from each other. However, the degree to which the outer edges 125 of the pixel electrodes 25 slip downwards from the protruding band part 129 is very small, and the capacitance formed between the pixel electrodes 25 and the capacitance wiring line 126 is normally barely affected.

Accordingly, it is possible for the array substrate 20 of the present embodiment to have a narrow distance set between the pixel electrodes 25 (25A and 25B) adjacent to each other across the capacitance wiring line 126. The array substrate 20 of the present embodiment, as described above, can have the protruding band part 129 formed on the surface thereof in the steps to pattern the second insulating film 29. Thus, it is possible to efficiently manufacture the array substrate 20 having the protruding band part 129 while using the same production equipment and without adding any manufacturing steps.

Embodiment 2

Embodiment 2 of the present invention will be explained below with reference to FIGS. 19 to 22. In the present embodiment, an active matrix substrate (an array substrate) is illustrated that is used for a liquid crystal panel of a liquid crystal display device 10, in a manner similar to Embodiment 1.

Figure 19:
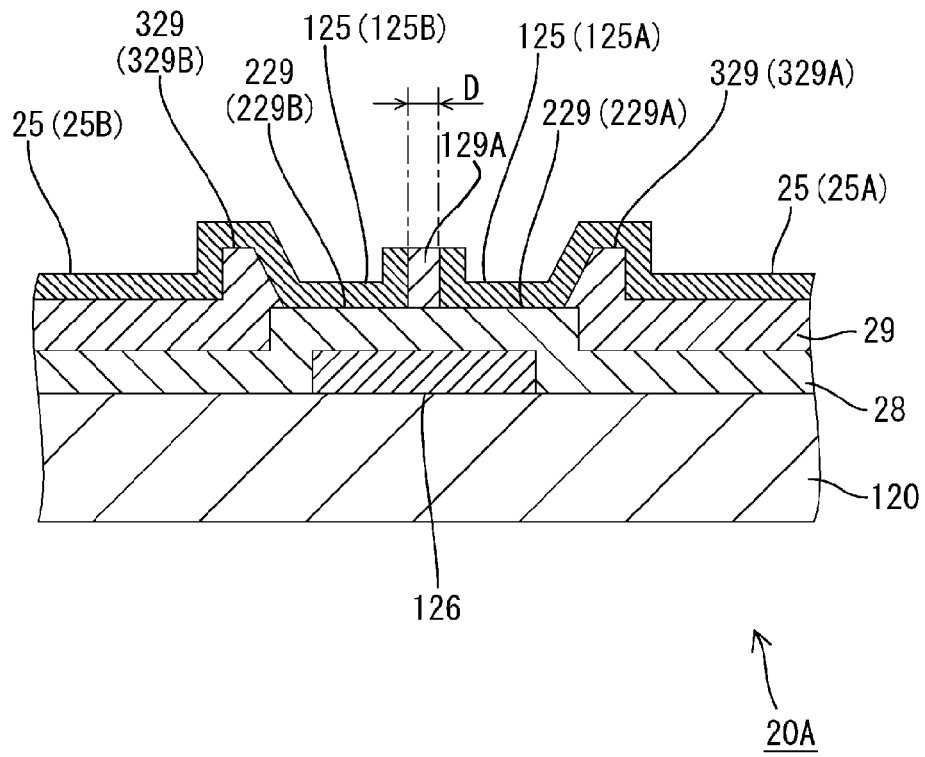
FIG. 19 is a cross-sectional view of an array substrate of Embodiment 2.

FIG. 19 is a cross-sectional view of the array substrate of Embodiment 2. The basic structure of this array substrate 20A is similar to the structure in Embodiment 1. FIG. 19 shows a part of the array substrate 20A close to a capacitance wiring line 126, in a manner similar to the array substrate 20 of Embodiment 1 shown in FIG. 4. As shown in FIG. 19, a protruding band part 129A of the present embodiment has a height (thickness) greater than that in Embodiment 1. This protruding band part 129A is formed by grooves 229 (229A and 229B) being engraved deeper than in Embodiment 1. In the present embodiment, the grooves 229 (229A and 229B) are disposed so as to go through a second insulating film 29.

Figure 20:
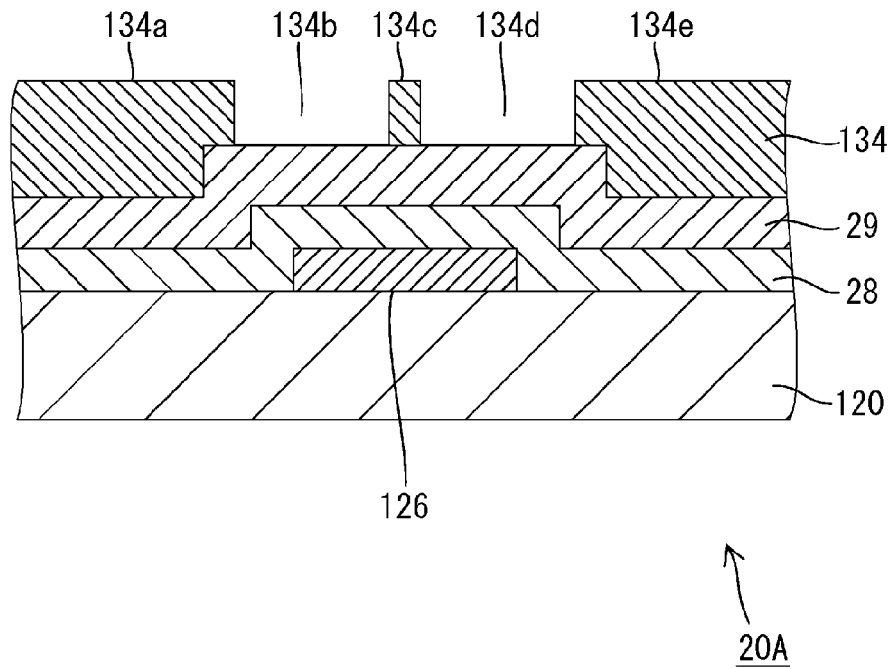
FIG. 20 is a view showing a step to develop a photoresist layer exposed to light via a third photomask in Embodiment 2.

The array substrate 20A having the protruding band part 129A as such is basically manufactured through similar manufacturing steps as those described in Embodiment 1. Mainly the differences in the manufacturing steps compared to Embodiment 1 will be explained below. FIG. 20 is a view showing a step to develop a photoresist layer exposed to light via a third photomask in Embodiment 2. As shown in FIG. 20, when a photoresist layer 134 is developed with a developing solution after exposure, the photoresist layer 134 is patterned and thick portions 134a, 134e, 134c, and removed portions 134b and 134d are formed. FIG. 20 shows a cross-sectional view in vicinity of the capacitance wiring line 126, in a manner similar to Embodiment 1.

The content shown in FIG. 20 corresponds to the content shown in FIG. 16 of Embodiment 1, and the thickness of portions 134b and 134d of the photoresist layer 134 are configured to be thinner than in Embodiment 1. In the present embodiment, a pattern of a third photomask is configured so that such a pattern is formed in the photoresist layer 134.

Figure 21:
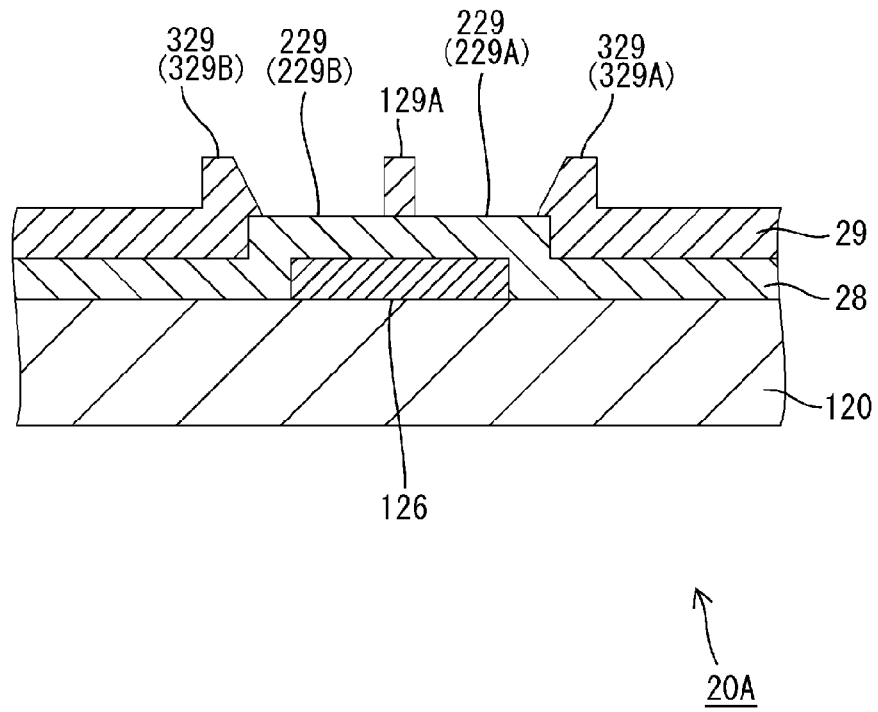
FIG. 21 is a view showing an etched second insulating film.

Next, the second insulating film 29 is etched, in a manner similar to Embodiment 1, with the photoresist layer 134 having such a pattern formed therein as the mask. Afterwards, the photoresist layer 134 is removed by ashing, in a manner similar to Embodiment 1. FIG. 21 is a view showing the etched second insulating film. As shown in FIG. 21, the second insulating film 29 is etched, and the protruding band part 129A and the grooves 229 (229A and 229B) are formed on the first insulating film 28, which covers the capacitance wiring line 126.

Figure 22:
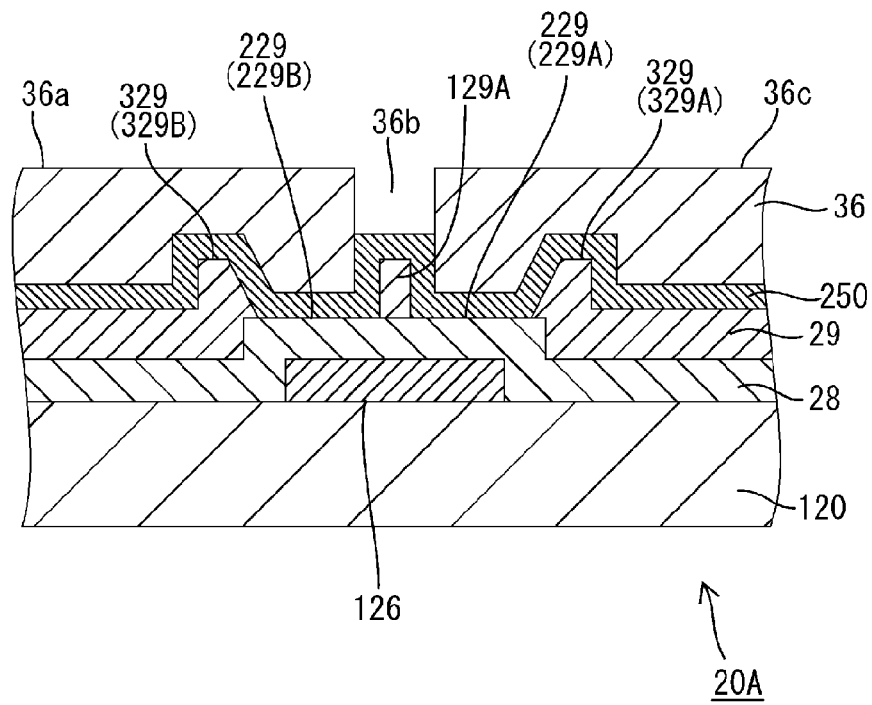
FIG. 22 is a view showing a step to pattern a transparent conductive film on the second insulating film to form a pixel electrode.

Afterwards, a transparent conductive film 250 is formed, in a manner similar to Embodiment 1, so as to cover the second insulating film 29, and the photoresist layer 36 is formed so as to cover the transparent conductive film 250. Afterwards, the photoresist layer 36 is exposed to light via the fourth photomask, and the patterned photoresist layer 36 is formed on the transparent conductive film 250. FIG. 22 is a view showing a step to pattern the transparent conductive film on the second insulating film to form the pixel electrodes. As shown in FIG. 22, the patterned photoresist layer 36 is made of thick portions 36a and 36c, and a portion 36b where a portion of the transparent conductive film 250 covering the protruding band part 129A is exposed. When the transparent conductive film 250 is etched with this photoresist layer 36 as the mask, patterned pixel electrodes 25 like those shown in FIG. 19 are obtained.

It is possible for the array substrate 20A of the present embodiment to also have a narrow distance set between pixel electrodes 25 (25A and 25B) adjacent to each other across the capacitance wiring line 126, in a manner similar to Embodiment 1. The array substrate 20A of the present embodiment, as described above, can also have the protruding band part 129A formed on the surface thereof in the steps to pattern the second insulating film 29. Thus, it is possible to efficiently manufacture the array substrate 20A having the protruding band part 129A while using the same production equipment and without adding any manufacturing steps. The array substrate 20A of the present embodiment has outer edges 125 of the pixel electrodes 25 that ride up (rise up) more than in Embodiment 1. When the outer edges 125 have such a shape, it is easier for the pixel electrodes 25 (25A and 25B) to become farther apart from each other than in Embodiment 1. Therefore, the pixel electrodes 25 (25A and 25B) can be more securely maintained in a state separated from each other.

Embodiment 3

Embodiment 3 of the present invention will be explained below with reference to FIG. 23. In the present embodiment, an active matrix substrate (an array substrate) is illustrated that is used for a liquid crystal panel of a liquid crystal display device 10, in a manner similar to Embodiment 1.

Figure 23:
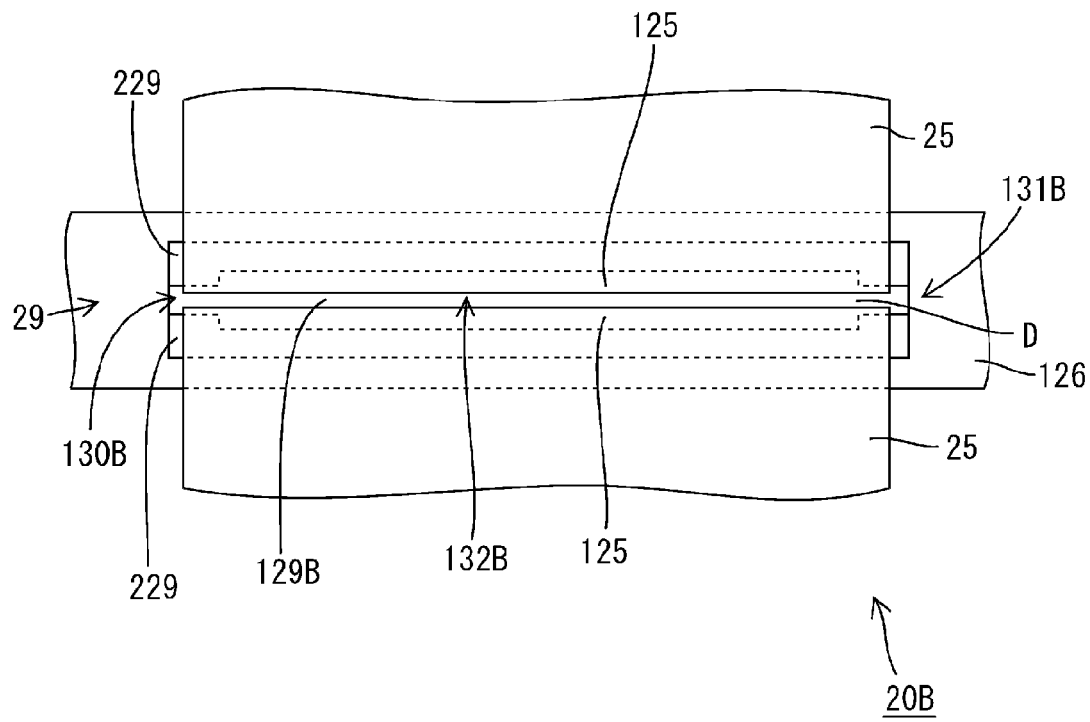
FIG. 23 is a plan view showing outer edges of pixel electrodes in an array substrate of Embodiment 3.

FIG. 23 is a plan view showing outer edges of pixel electrodes in the array substrate of Embodiment 3. The basic structure of an array substrate 20B of the present embodiment is similar to the structure in Embodiment 1. However, a protruding band part 129B on the array substrate 20B of the present embodiment has a different shape than in Embodiment 1.

While the protruding band part 129B of the present embodiment linearly extends along the wiring line direction of a capacitance wiring line 126, in a manner similar to Embodiment 1, the line width of both end parts 130B and 131B thereof is configured narrower (thinner) than the line width of a middle part 132B interposed therebetween. The protruding band part 129B is made of a second insulating film 29, in a manner similar to Embodiment 1, and the thickness is uniform. The protruding band part 129B of the present embodiment is patterned so as to have such a shape in a manufacturing step thereof.

When the protruding band part 129b has such a shape, the outer edge 125 portions of the pixel electrodes 25 riding up on both of the end parts 130B and 131B are thinner than the outer edge 125 portions of the pixel electrodes 25 riding up on the middle part 132B, and are easier to separate from the protruding band part 129B. Therefore, the gap between the pixel electrodes 25 and 25, which face each other across the capacitance wiring line 126, becomes wider on both ends thereof.

As a result, a groove (a distance D) for separating the adjacent pixel electrodes 25 and 25 from each other is easier to form when wet etching a transparent conductive film 250 to pattern the pixel electrodes 25. During wet etching, unnecessary portions of the transparent conductive film (portions corresponding to the groove, for example) need to be removed along with the solvent. As in the present embodiment, when the line width of both of the end parts 130B and 131B of the protruding band part 129B is configured to be narrow, as described above the gap (the distance D) between the pixel electrodes 25 and 25 facing each other across the capacitance wiring line 126 becomes wider on both ends thereof, resulting in the portion of the transparent conductive film for the grooves becoming easier to remove along with the solvent. Therefore, the leaving behind of transparent conductive film between the pixel electrodes 25 and 25 (the so-called film residue) is suppressed.

Embodiment 4

Embodiment 4 of the present invention will be explained below with reference to FIG. 24. In the present embodiment, an active matrix substrate (an array substrate) is illustrated that is used for a liquid crystal panel of a liquid crystal display device 10, in a manner similar to Embodiment 1.

Figure 24:
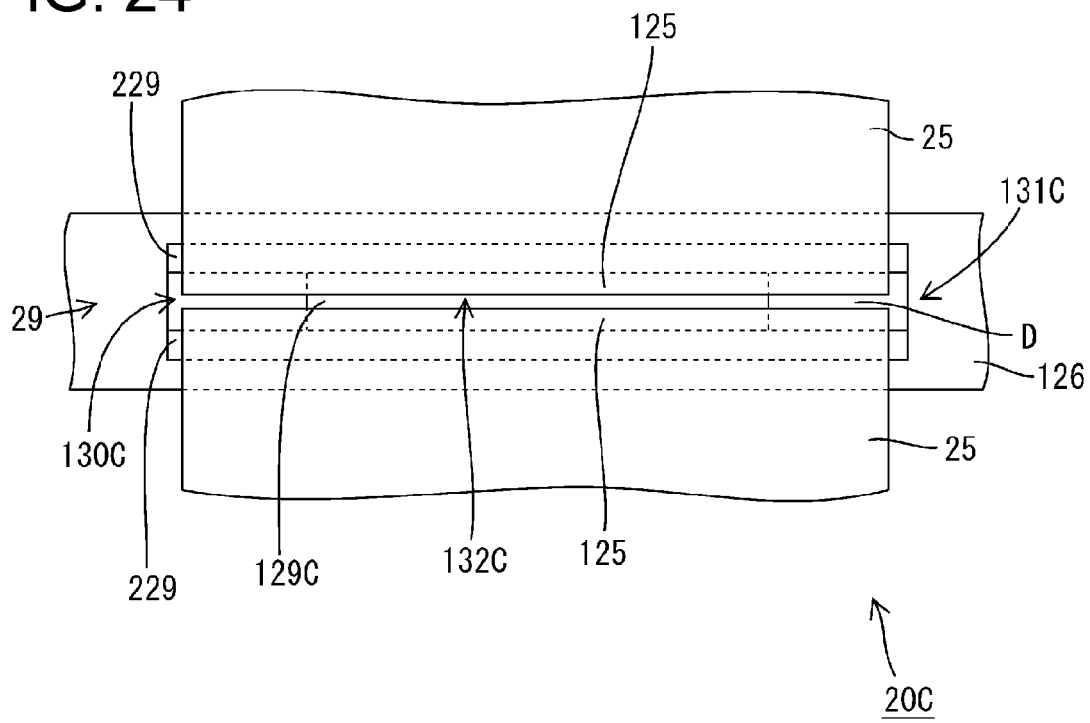
FIG. 24 is a plan view showing outer edges of pixel electrodes in an array substrate of Embodiment 4.

FIG. 24 is a plan view showing outer edges of pixel electrodes in the array substrate of Embodiment 4. The basic structure of an array substrate 20C of the present embodiment is similar to the structure in Embodiment 1. However, a protruding band part 129C on the array substrate 20C of the present embodiment has a different shape than in Embodiment 1.

As shown in FIG. 24, while the protruding band part 129C of the present embodiment linearly extends along the wiring line direction of a capacitance wiring line 126, in a manner similar to Embodiment 1, the height of both end parts 130C and 131C thereof is configured to be lower than the height of a middle part 132C interposed therebetween. The surface of the middle part 132C is flat, and the height is configured so as to be uniform. The protruding band part 129C of the present embodiment is patterned so as to have such a shape in a manufacturing step thereof.

When the shape of the protruding band part 129C is set as such, a groove (a distance D) for separating the adjacent pixel electrodes 25 and 25 from each other is easier to form when wet etching a transparent conductive film to pattern the pixel electrodes 25. During wet etching, unnecessary portions of the transparent conductive film (portions corresponding to the groove, for example) need to be removed along with the solvent. As in the present embodiment, when the height of both ends of the protruding band part 129C has been lowered, both ends of the outer edges 125 of the pixel electrodes 25 will slant downwards, and thus the portion of the transparent conductive film for the groove becomes easier to remove along with the solvent. Then, the leaving behind of transparent conductive film between the pixel electrodes 25 and 25 without being removed (the so-called film residue) is suppressed.

Embodiment 5

Figure 25:
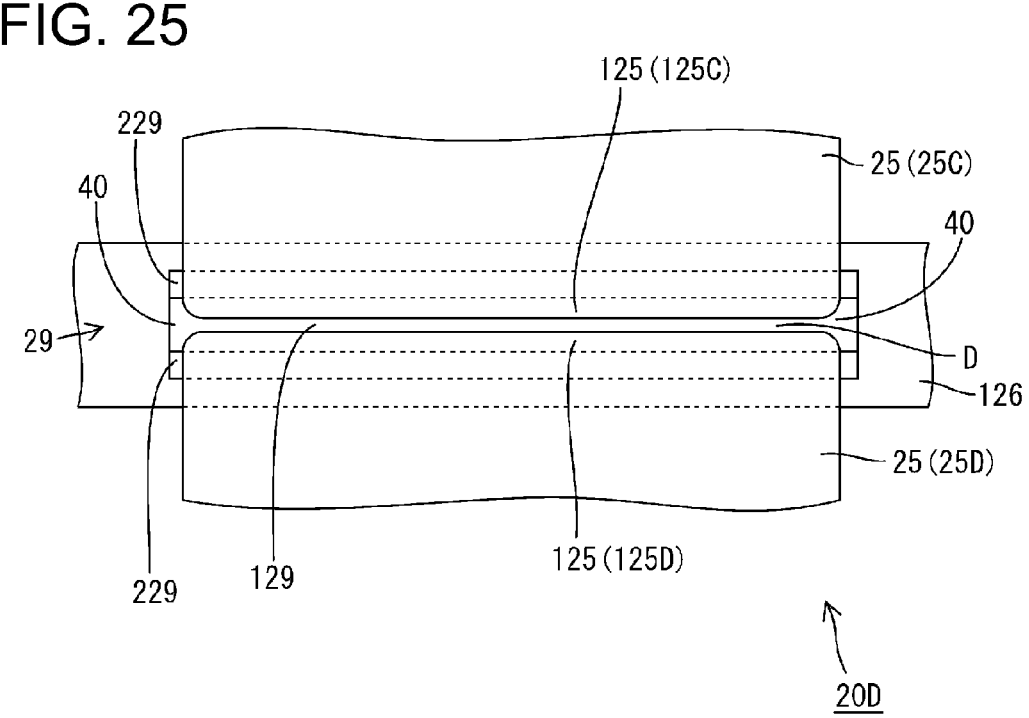
FIG. 25 is a plan view showing outer edges of pixel electrodes in an array substrate of Embodiment 5.

Embodiment 5 of the present invention will be explained below with reference to FIG. 25. In the present embodiment, an active matrix substrate (an array substrate) is illustrated that is used for a liquid crystal panel of a liquid crystal display device 10, in a manner similar to Embodiment 1. FIG. 25 is a plan view showing outer edges of pixel electrodes in the array substrate of Embodiment 5. The basic structure of an array substrate 20D of the present embodiment is similar to the structure in Embodiment 1. However, the shape of outer edges 125 (125C and 125D) of pixel electrodes 25 (25C and 25D) on the array substrate 20D of the present embodiment is different than that in Embodiment 1.

As shown in FIG. 25, both end parts of the outer edges (125C and 125D) of the pixel electrodes 25 (25C and 25D) on the array substrate 20D of the present embodiment are cut out so as to be rounded (so as to be a curved shape). In other words, the outer edges (125C and 125D) of the pixel electrodes 25 (25C and 25D) have a belt shape that extends along a capacitance wiring line 126, and have a cut-out part at both ends of the end parts of the belt-shape. Thus, large gaps 40 and 40 are formed in spaces between the pixel electrodes 25 (25C and 25D) between the cut-out portions.

When the shape of the outer edges 125 (125C and 125D) of the pixel electrodes 25 (25C and 25D) is set as such, it is possible to suppress the occurrence of film residue in a groove (a distance D), for separating the adjacent pixel electrodes 25 and 25 from each other, when wet etching the transparent conductive film to pattern the pixel electrodes 25 (25C and 25D). In other words, because there are the large gaps 40 and 40 in front of and behind the groove (the distance D) between the pixel electrodes 25 (25C and 25D), the portion of the transparent conductive film corresponding to the groove becomes easier to remove along with the solvent during wet etching. Furthermore, it is also easier for the solvent to enter the portion corresponding to the groove (the gap in the patterned photoresist layer formed on the transparent conductive film).

Embodiment 6

Figure 26:
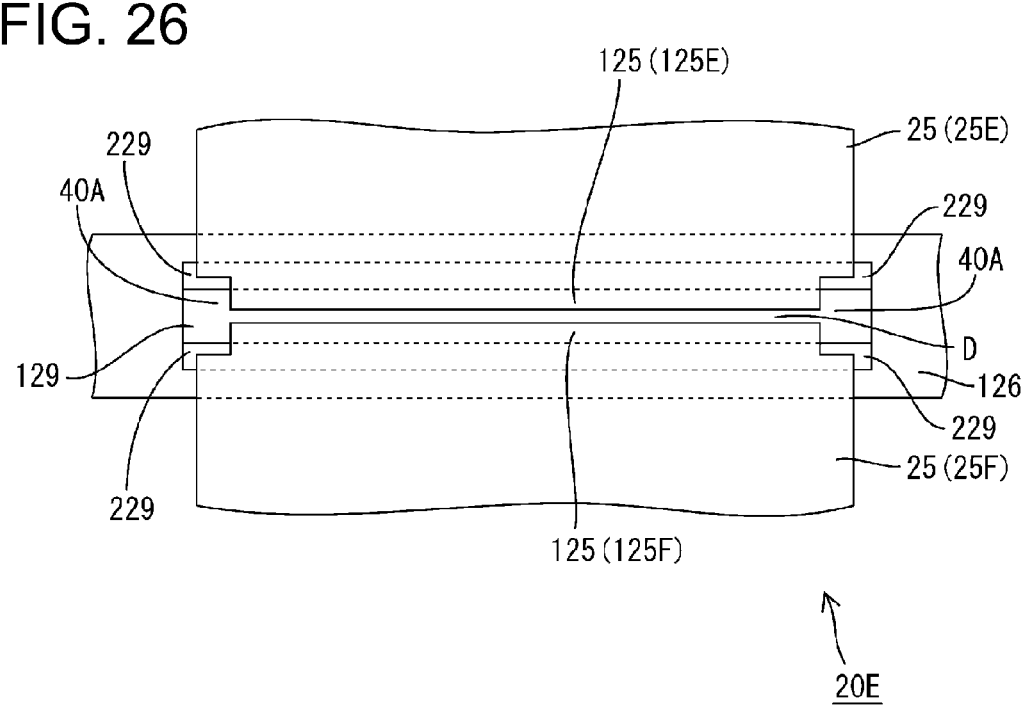
FIG. 26 is a plan view showing outer edges of pixel electrodes in an array substrate of Embodiment 6.

Embodiment 6 of the present invention will be explained below with reference to FIG. 26. In the present embodiment, an active matrix substrate (an array substrate) is illustrated that is used for a liquid crystal panel of a liquid crystal display device 10, in a manner similar to Embodiment 1. FIG. 26 is a plan view showing outer edges of pixel electrodes in the array substrate of Embodiment 6. The basic structure of an array substrate 20E of the present embodiment is similar to the structure in Embodiment 1. However, the shape of outer edges 125 (125E and 125F) of pixel electrodes 25 (25E and 25F) on the array substrate 20E of the present embodiment is different than that in Embodiment 1.

As shown in FIG. 26, the outer edges 125 (125E and 125F) of the pixel electrodes 25 (25E and 25F) on the array substrate 20E of the present embodiment have only the center portion thereof riding up on a protruding band part 129. Both of the end parts of the outer edges 125 (125E and 125F) are cut out. In other words, when the array substrate 20E is viewed in a plan view, the length of the pixel electrodes 25 (25E and 25F) in the source wiring line direction is configured so that both end parts are shorter than the central part. Thus, large gaps 40A and 40A are formed in spaces between the pixel electrodes 25 (25E and 25F) between the cut-out portions.

When the shape of the outer edges 125 (125E and 125F) of the pixel electrodes 25 (25E and 25F) is set as such, it is possible to suppress the occurrence of film residue in a groove (a distance D), for separating the adjacent pixel electrodes 25 and 25 from each other, when wet etching the transparent conductive film to pattern the pixel electrodes 25 (25E and 25F). In other words, because there are the large gaps 40A and 40A in front of and behind the groove (the distance D) between the pixel electrodes 25 (25E and 25F), the portion of the transparent conductive film corresponding to the groove becomes easier to remove along with the solvent during wet etching. Furthermore, it is also easier for the solvent to enter the portion corresponding to the groove (the gap in the patterned photoresist layer formed on the transparent conductive film).

Other Embodiments

The present invention is not limited to the embodiments shown in the drawings and described above, and the following embodiments are also included in the technical scope of the present invention, for example.

(1) In the embodiments described above, a protruding band part was arranged in the center of a capacitance wiring line, but as long as the aims of the present invention are able to be achieved, in other embodiments the protruding band part may be arranged in a location other than the center of the capacitance wiring line.

(2) In the embodiments described above, a continuous material was used along the wiring line direction of a capacitance wiring line in each pixel for a protruding band part, but as long as the aims of the present invention are able to be achieved, in other embodiments the protruding band part may be segmented along the way.

(3) A protruding band part may be disposed for all pixels, or as necessary may be disposed for certain pixels.

(4) In the embodiments described above, a liquid crystal display device that performs color display was used, but the present invention can also be applied to a liquid crystal display device that performs black and white display.

DESCRIPTION OF REFERENCE CHARACTERS

10 liquid crystal display device (display device)
11 liquid crystal panel (display panel)
12 illumination device
13 bezel
14 chassis
16 optical member 17 frame
18 cold cathode fluorescent lamp (light source)
20 array substrate (active matrix substrate)
21 opposite substrate
24 TFT
24a source electrode
24b drain electrode
25 pixel electrode
125 outer edge of pixel electrode
26 gate wiring line
126 capacitance wiring line
27 source wiring line
129 protruding band part
124 semiconductor film

The invention claimed is:

1. An active matrix substrate, comprising:
pixel electrodes formed in respective areas demarcated by a plurality of gate wiring lines and source wiring lines that intersect each other; and
capacitance wiring lines that are arranged in parallel with the gate wiring lines, the capacitance wiring lines respectively forming capacitances with the pixel electrodes,
wherein the capacitance wiring lines are arranged overlapping outer edges of the pixel electrodes adjacent to each other,
wherein each of the capacitance wiring lines has formed thereon:
a first insulating film that covers the capacitance wiring line; and
a second insulating film formed on the first insulating film, and provided with a protruding band part that has a line width narrower than a line width of the capacitance wiring line and that is arranged along the capacitance wiring line, and
wherein the pixel electrodes are formed on the second insulating film such that the outer edges of the pixel electrodes adjacent to each other respectively ride up on the protruding band part.

2. The active matrix substrate according to claim 1, wherein the protruding band part includes two end parts and a middle part interposed therebetween, and a height of the end parts is set lower than a height of the middle part.

3. The active matrix substrate according to claim 1, wherein the protruding band part includes two end parts and a middle part interposed therebetween, and a line width of the end parts is set narrower than a line width of the middle part.

4. The active matrix substrate according to claim 1, wherein end parts of the pixel electrodes have a belt shape that extends along each of the capacitance wiring lines, and have cut-out parts at both ends on an edge of the belt shape.

5. A display panel, comprising the active matrix substrate according to claim 1.

6. A display device, comprising:
an illumination device; and
the display panel according to claim 5 that uses light from the illumination device to perform a display.

7. A television receiving device, comprising the display device according to claim 6.

* * * * *